US012793651B2

(12) United States Patent
Sang et al.

(10) Patent No.: US 12,793,651 B2
(45) Date of Patent: Nov. 10, 2026

(54) DISPLAY DEVICE AND DRIVING METHOD THEREOF

(71) Applicant: LG Display Co., Ltd., Seoul (KR)

(72) Inventors: Woo Kyu Sang, Paju-si (KR); Moon Soo Chung, Paju-si (KR); Tae Hun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/268,327

(22) Filed: Jul. 14, 2025

(65) Prior Publication Data

US 2026/0045225 A1 Feb. 12, 2026

(30) Foreign Application Priority Data

Aug. 6, 2024 (KR) ........................ 10-2024-0104590

(51) Int. Cl.
*G09G 3/3266* (2016.01)
*G09G 3/3291* (2016.01)

(52) U.S. Cl.
CPC ......... *G09G 3/3266* (2013.01); *G09G 3/3291* (2013.01); *G09G 2300/043* (2013.01); *G09G 2310/08* (2013.01); *G09G 2320/0223* (2013.01); *G09G 2320/0233* (2013.01); *G09G 2320/0247* (2013.01); *G09G 2320/0271* (2013.01)

(58) Field of Classification Search
None
See application file for complete search history.

(56) References Cited

U.S. PATENT DOCUMENTS

2020/0226978 A1* 7/2020 Lin ..................... G09G 3/3233

FOREIGN PATENT DOCUMENTS

KR 10-2022-0094952 A 7/2022

* cited by examiner

*Primary Examiner* — Brian M Butcher
(74) *Attorney, Agent, or Firm* — Fenwick & West LLP

(57) ABSTRACT

A display device includes a display panel including a one pixel, a source driver configured to supply a data voltage to the pixel during a refresh frame, a scan driver configured to supply the pixel with a scan signal that defines a timing of a first on-bias stress (OBS) period that precedes a timing at which the data voltage is supplied to the pixel and a timing of a second OBS period that succeeds the timing at which the data voltage is supplied to the pixel and precedes an emission timing of the pixel, and an OBS control circuit configured to supply a first OBS voltage having a first level to the pixel during the first OBS period and supply a second OBS voltage having a second level that is different from the first level to the pixel during the second OBS period.

17 Claims, 18 Drawing Sheets

[Refresh Frame]

[Refresh Frame]

[Skip Frame]

Time

[Refresh Frame]

DISPLAY DEVICE AND DRIVING METHOD THEREOF

CROSS-REFERENCE TO RELATED APPLICATION

This application claims the benefit of the Republic of Korea Patent Application No. 10-2024-0104590 filed on Aug. 6, 2024, which is hereby incorporated by reference in its entirety.

BACKGROUND

Field of Technology

The present disclosure relates to a display device and a driving method thereof.

Discussion of the Related Art

Display apparatuses include a plurality of pixels arranged as a matrix type and implement luminance corresponding to image data by using the pixels. In display devices, technology where a refresh rate varies based on an attribute of an image has been known. Variable refresh rate (VRR) technology increases a data refresh cycle as a variation of an image is reduced, and thus, decreases power consumption.

A data refresh operation is performed in a refresh frame and is not performed in a skip frame. As the number of skip frames provided between adjacent refresh frames increases, a data refresh cycle increases, and low-speed driving is implemented.

Due to a leakage characteristic variation occurring in pixels, a luminance deviation between frames may occur. Such a luminance deviation is more considerable in low-speed driving where a data refresh cycle is long, and due to this, a flicker characteristic may decrease (i.e., the amount of flickers may increase).

SUMMARY

To overcome the aforementioned problem of the related art, the present disclosure may provide a display device and a driving method thereof, which may improve a flicker characteristic and may enhance low grayscale expression.

To achieve these objects and other advantages and in accordance with the purpose of the disclosure, as embodied and broadly described herein, a display device includes: a display panel including at least one pixel; a source driver configured to supply a data voltage to the at least one pixel during a refresh frame; a scan driver configured to supply the at least one pixel with a scan signal during the refresh frame, the scan signal defining a timing of a first on-bias stress (OBS) period that precedes a timing at which the data voltage is supplied to the at least one pixel and a timing of a second OBS period that succeeds the timing at which the data voltage is supplied to the at least one pixel and precedes an emission timing of the at least one pixel during which the at least one pixel emits light based on the data voltage; and an OBS control circuit configured to supply a first OBS voltage to the at least one pixel during the first OBS period and supply a second OBS voltage to the at least one pixel during the second OBS period, the first OBS voltage having a first level and the second OBS voltage having a second level that is different from the first level.

In one embodiment, a driving method of a display device including a display panel comprising at least one pixel, the driving method comprising: supplying a data voltage to the at least one pixel during a refresh frame; supplying the at least one pixel with a scan signal during the refresh frame, the scan signal defining a timing of a first on-bias stress (OBS) period that precedes a timing at which the data voltage is supplied to the at least one pixel and a timing of a second OBS period that succeeds the timing at which the data voltage is supplied to the at least one pixel and precedes an emission timing of the at least one pixel during which the at least one pixel emits light based on the data voltage; and supplying a first OBS voltage to the at least one pixel during the first OBS period and supplying a second OBS voltage to the at least one pixel during the second OBS period, the first OBS voltage having a first level and the second OBS voltage having a second level that is different from the first level.

In one embodiment, a display device comprises: a display panel including a pixel, the pixel comprising: a driving transistor including a gate electrode connected to a first node, a first electrode connected to a second node, and a second electrode connected to a third node; a light-emitting element electrically connected to the second electrode of the driving transistor; a first switch transistor connected to the gate electrode of the driving transistor at the first node and second electrode of the driving transistor at the third node; a second switch transistor connected to the first electrode of the driving transistor at the second node and to a data line that supplies a data voltage; and a bias switch transistor connected to the first electrode of the driving transistor at the second node and to a bias line that supplies to the bias switch transistor one of a first bias voltage or a second bias voltage that is different from the first bias voltage; a source driver configured to supply the data voltage to the data line during a refresh frame; and a scan driver a scan driver configured to supply the pixel with a scan signal during the refresh frame, the scan signal defining a timing of a first on-bias stress (OBS) period that is before a timing at which the data voltage is supplied to the pixel and a timing of a second OBS period that is after the timing at which the data voltage is supplied to the pixel and is before an emission period of the pixel during which the light-emitting element emits light based on the data voltage, wherein the bias switch transistor applies the first bias voltage to the first electrode of the driving transistor during the first OBS period and applies the second bias voltage that is different from the first bias voltage to the first electrode of the driving transistor during the second OBS period during the refresh frame.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
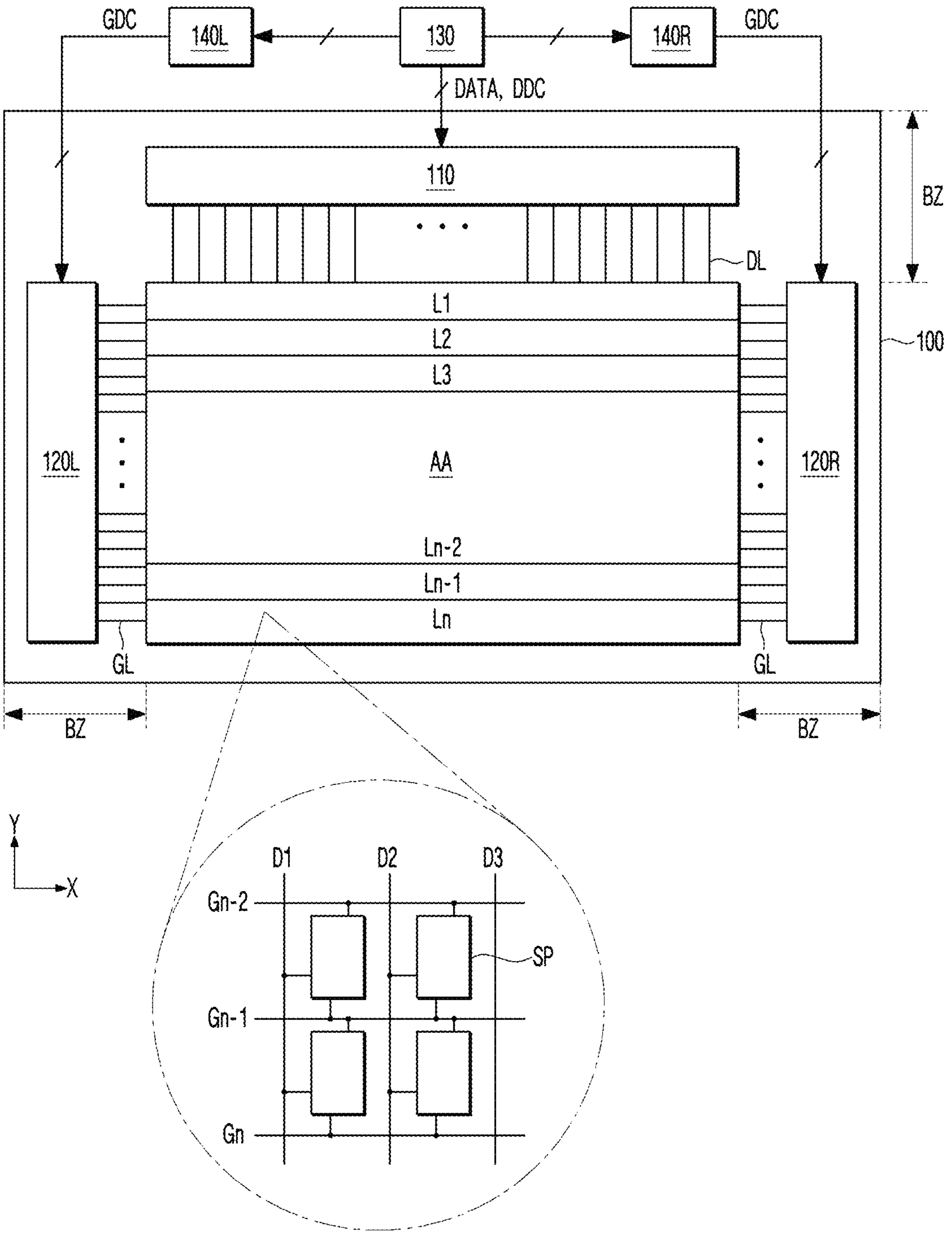
FIG. 1 is a diagram illustrating a display device according to an embodiment of the present disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms “comprise”, “having,” “including” and the like suggest that other parts can be added unless the term “only” is used. As used herein, the singular forms “a”, “an”, and “the” are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as “on~”, “over~”, “under~”, and “next~”, one or more other parts may be disposed between the two parts unless “just” or “direct” is used.

It will be understood that, although the terms “first”, “second”, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a diagram illustrating a display device according to an embodiment of the present disclosure.

Referring to FIG. 1, the display device according to an embodiment of the present embodiment may be an organic light emitting display device, but is not limited thereto. A display panel 100 may include an active area AA which reproduces an input image. The active area AA may include a pixel array which displays pixel data (hereinafter referred to as “image data”) DATA of an input image. The pixel array may include a plurality of data lines DL, a plurality of gate lines GL intersecting with the data lines DL, and a plurality of pixels SP.

The pixels SP may be arranged on the active area AA in a matrix type defined by intersections between the data lines DL and the gate lines GL. The pixels SP may be arranged as various types such as a stripe type and a diamond type on the active area AA, based on positions of the pixels SP emitting lights of the same color.

The pixel array may include a plurality of pixel columns and a plurality of pixel lines L1 to Ln intersecting with the pixel columns. Each of the pixel columns may include pixels SP which are arranged in a Y-axis direction. A pixel row may include pixels SP which are arranged in an X-axis direction. One vertical period may be one frame period needed for writing image data DATA of one frame in all pixels of the active area. One horizontal period may be a time obtained by dividing one frame period by the number of pixel lines L1 to Ln. One horizontal period may be a time needed for writing the image data DATA of one pixel line, sharing a gate line GL, in pixels SP of one pixel line.

The pixels SP may include a first pixel which generates red (R) light, a second pixel which generates green (G) light, and a third pixel which generates blue (B) light, for various color combinations. The pixels SP may further include a fourth pixel which generates white (W) light. The first to third pixels or the first to fourth pixels may configure one unit pixel.

Each of the pixels SP may be implemented with a pixel circuit connected to a data line DL and a gate line GL. The pixel circuit may include a light emitting element, a driving transistor, one or more switch transistors, and a capacitor. The light emitting element may be implemented as an organic light emitting diode (OLED) (e.g., a light emitting element). A driving current applied to the light emitting element may be controlled based on a gate-source voltage of the driving transistor. The gate-source voltage of the driving transistor may be determined by a data voltage corresponding to the image data DATA. In FIG. 1, "D1 to D3" illustrated in a circle may be data lines, and "Gn−2 to Gn" may be gate lines. Each of the pixels SP of FIG. 1 may be further connected to a front-end gate line as well as a current-end gate line. For example, each of pixels SP disposed in an nth pixel line Ln may be connected to a front-end gate line Gn−1 as well as an nth gate line Gn.

The pixel circuit may sample a threshold voltage of the driving transistor in the middle of a pixel programming operation which is performed in one frame period and may allow a sampled threshold voltage to be reflected in a gate-source voltage (hereinafter referred to as Vgs) of the driving transistor, and thus, may prevent a driving current from being distorted due to a threshold voltage variation of the driving transistor.

The pixel circuit may be implemented as a hybrid type. In a hybrid-type pixel circuit, semiconductor layers of some transistors may include low-temperature polycrystalline silicon (hereinafter referred to as LTPS), and semiconductor layers of the other transistors may be configured with oxide.

The pixel circuit may be driven based on variable refresh rate (VRR) technology. To implement the VRR variable technology, one or more skip frames may be provided between adjacent refresh frames. A refresh rate (i.e., a frame frequency) may be determined based on the number of skip frames provided between adjacent refresh frames.

A data refresh operation including pixel initialization and data programming may be performed in a refresh frame. The light emitting element may be turned off when performing a data refresh operation, and at this time, an anode reset operation where the light emitting element is initialized into an anode reset voltage may be performed.

A data refresh operation on the pixels SP may be omitted (or skipped) in a skip frame, and a data refresh condition (Vgs, the driving current, etc.) which is set in a refresh frame may be maintained. Thus, the data voltage is not supplied to a pixel during the skip frame. The data voltage programmed during the refresh frame is maintained during the skip frame. An anode reset operation for turning off the light emitting element may be performed in the skip frame. Accordingly, a time length where the light emitting element is turned on in the skip frame may be substantially equal to a time length where the light emitting element is turned on in the refresh frame.

In each of the refresh frame and the skip frame, while the anode reset operation is being performed, an on-bias stress (OBS) operation may be performed on the driving transistor.

In the hybrid-type pixel circuit according to the present embodiment, the OBS operation may be for preventing or at least reducing an image quality defect caused by a hysteresis characteristic of the driving transistor. When a grayscale value of the image data DATA is changed from black to white, a grayscale response time may increase in a first frame where a white image is reproduced, due to a time needed for varying the hysteresis characteristic of the driving transistor, and thus, a dim first frame (DFF) phenomenon may occur. At this time, when the Vgs of the driving transistor increases by applying an OBS voltage to one electrode of the driving transistor, a DFF characteristic may be alleviated. This may be referred to as an OBS operation.

Touch sensors may be further disposed on the display panel 100. The touch sensors may be arranged as an on-cell or add-on type on the active area AA of the display panel 100 or may be implemented as in-cell type touch sensors embedded in the pixel array. A touch input may be sensed through only the pixels SP even without the touch sensors, and in this case, the touch sensors may be omitted.

A display panel driver may include a source driver 110 and gate drivers 120L and 120R. The display panel driver may write the image data DATA in the pixels SP of the display panel 100, based on control by a timing controller 130.

A source driver 110 may convert the image data DATA, received from the timing controller 130, into gamma compensation voltages by using a digital-to-analog converter (DAC) to generate data voltages. The source driver 110 may supply the data voltages to the data lines DL. The data voltages may be supplied to the data lines DL and may be applied to gate electrodes of the driving transistors through the switch transistors of the subpixels SP. The source driver 110 may be implemented with a plurality of source drive integrated circuits (ICs).

To reduce a resistor-capacitor (RC) delay deviation occurring in the display panel 100 including a large active area, the gate drivers 120L and 120R may be implemented as a double bank type. That is, the gate drivers 120L and 120R may be provided as a gate driver in panel (GIP) type in left and right bezel areas BZ disposed outside the active area AA of the display panel 100 and may supply gate signals having the same phase to the same gate line GL at both sides of the display panel 100. In one embodiment, the bezel areas BZ at least partially surround the active area AA. The gate drivers 120L and 120R may include a first-side gate driver 120L which is disposed in the left bezel area BZ of the display panel 100 and a second-side gate driver 120R which is disposed in the right bezel area BZ of the display panel 100.

The gate drivers 120L and 120R at both sides may sequentially supply a gate signal to the gate lines GL, based on control by the timing controller 130. The gate signal may select pixel rows L1 to Ln charged with data voltages and may simultaneously activate pixels SP disposed in corresponding pixel rows L1 to Ln. The gate drivers 120L and 120R may output a gate signal needed for pixel driving and may shift the gate signal by pixel row units. The gate signal may include a plurality of scan signals which swing between an on level and an off level and an emission control signal. The gate drivers 120L and 120R at both sides may include a plurality of scan drivers which generate a plurality of scan signals and an emission driver which generates an emission control signal.

In the left and right bezel areas BZ, a below-described OBS control circuit and the gate drivers 120L and 120R may configure a GIP circuit block. The OBS control circuit may shift an OBS voltage from a first level to a second level differing from the first level in a refresh frame, and thus, may improve a flicker characteristic and may enhance low gray-scale expression. An OBS control operation may be performed based on an output of one of the plurality of scan drivers. This will be described below in detail.

The timing controller 130 may receive video data DATA and a timing signal, synchronized with the video data DATA, from a host system (not shown). The timing signal may include a vertical synchronization signal Vsync, a horizontal synchronization signal Hsync, a clock signal DCLK, and a data enable signal DE. The vertical synchronization signal Vsync may define a vertical period. The horizontal synchronization signal Hsync may define a horizontal period. The data enable signal DE may define a time where the video data DATA is transferred, in a vertical period or a horizontal period. The vertical period and the horizontal period may be determined by a method of counting the data enable signal DE, and thus, the vertical synchronization signal Vsync and the horizontal synchronization signal Hsync may be omitted.

The timing controller 130 may generate a source timing control signal DDC for controlling an operation timing of the source driver 110 and a gate timing control signal GDC for controlling an operation timing of the gate drivers 120L and 120R, based on the timing signal Vsync, Hsync, and DE received from the host system.

The host system may be one of a television (TV), a set-top box, a navigation system, a personal computer (PC), a home theater, an automotive display system, a mobile device, and a wearable device. In the mobile device and the wearable device, the source driver 110, the timing controller 130, and level shifters 140L and 140R may be integrated into one drive IC.

The level shifters 140L and 140R may convert a voltage of the gate timing control signal GDC, output from the timing controller 130, into an on-level voltage and an off-level voltage and may supply the on-level voltage and the off-level voltage to the gate drivers 120L and 120R.

The level shifters 140L and 140R may include a first level shifter 140L which is connected to the first-side gate driver 120L through first signal lines and a second level shifter 140R which is connected to the second-side gate driver 120R through second signal lines.

Figure 2:
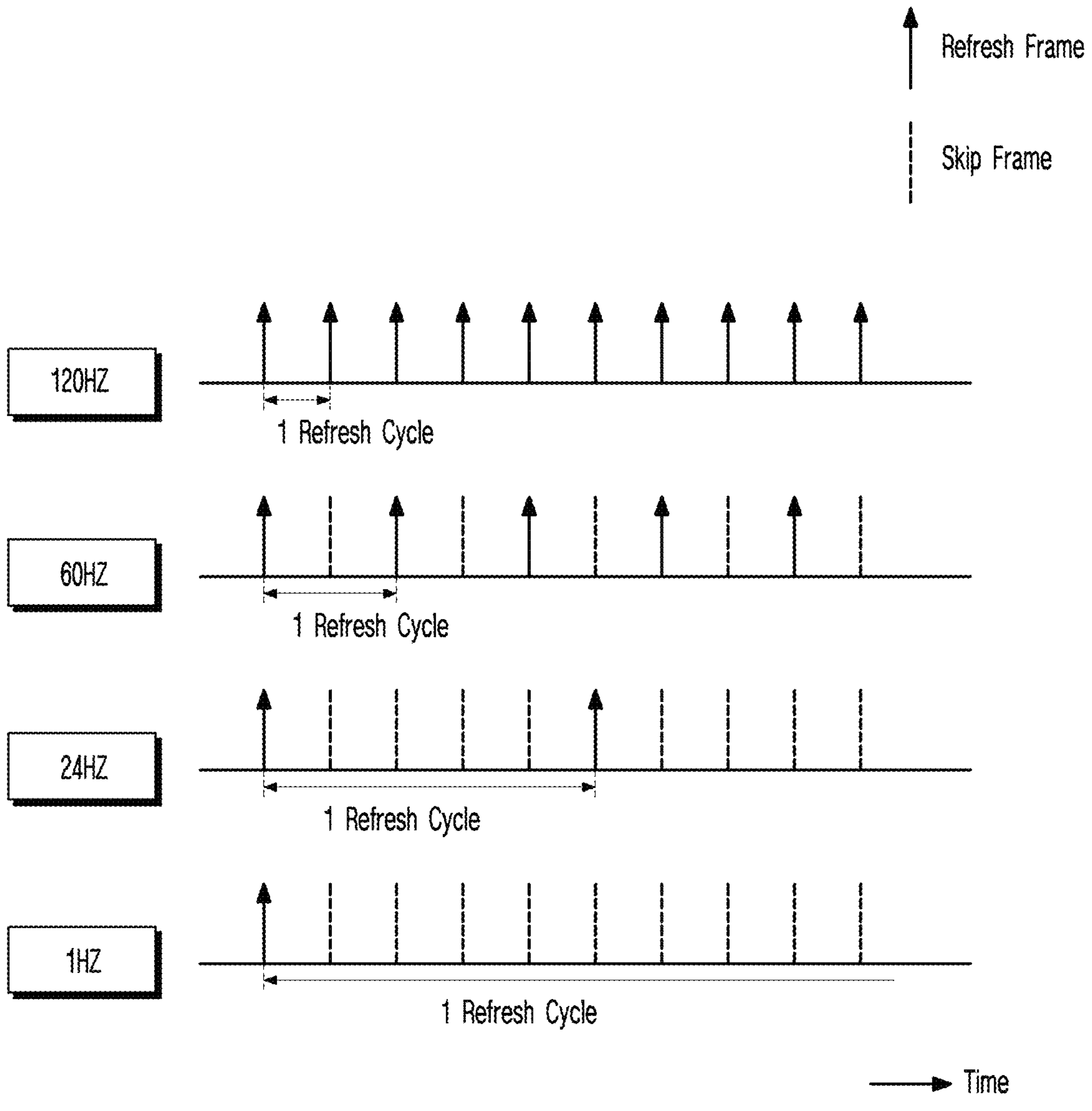
FIG. 2 is a diagram illustrating an example of variable refresh rate (VRR) technology applied to a display device according to an embodiment of the present disclosure.

FIG. 2 is a diagram illustrating an example of variable refresh rate (VRR) technology applied to a display device according to an embodiment of the present disclosure.

Referring to FIG. 2, a data refresh cycle implemented in pixels of a display panel may vary based on an attribute of an input image. The data refresh cycle may get shorter when the amount of variation of an image is large, and when the amount of variation of the image is small, the data refresh cycle may get longer. As the data refresh cycle is longer, low-speed driving may be performed, and as the data refresh cycle is shorter, high-speed driving may be performed.

The data refresh cycle may be 1/frame frequency. For example, the data refresh cycle may be 1 sec/120 in 120 Hz, 1 sec/60 in 60 Hz, 1 sec/24 in 24 Hz, and 1 sec in 1 Hz.

The number of skip frames provided between two adjacent refresh frames may vary based on a frame frequency. For example, the number of skip frames may be 0 in 120 Hz, 1 in 60 Hz, 4 in 24 Hz, and 119 in 1 Hz.

Due to a leakage characteristic variation occurring in pixels, a luminance deviation between frames may occur. Such a luminance deviation is more noticeable in low-speed driving where a data refresh cycle is long, and due to this, a flicker characteristic may be degraded (i.e., the amount of flickers may increase).

Figure 3:
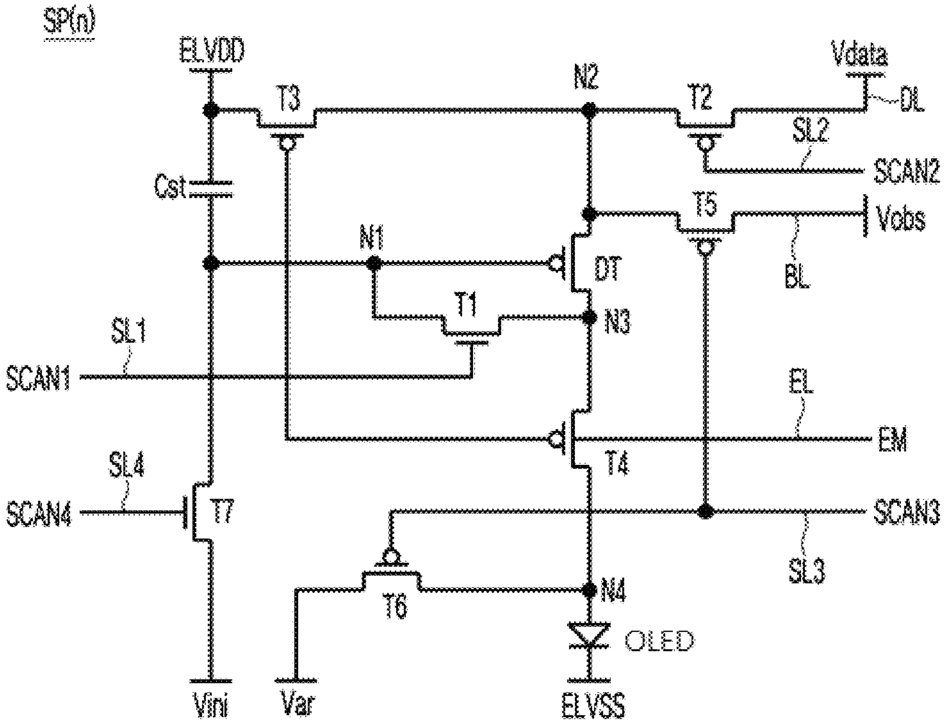
FIG. 3 is a diagram illustrating a pixel according to an embodiment of the present disclosure.

FIG. 3 is a diagram illustrating a pixel SP disposed in an nth pixel row Ln according to an embodiment of the present disclosure.

Referring to FIG. 3, the pixel SP disposed in the nth pixel row Ln may be implemented with a pixel circuit which includes a light emitting element OLED, a driving transistor DT, switch transistors (for example, first to seventh switch transistors) T1 to T7, and a capacitor Cst.

The driving transistor DT, the switch transistors T1 to T7, and the capacitor Cst may control a driving current flowing in the light emitting element OLED light emitting element. Each of the driving transistor DT and the switch transistors T1 to T7 may include a first electrode, a second electrode, and a gate electrode. One of the first electrode and the second electrode may be a source electrode, and the other of the first electrode and the second electrode may be a drain electrode.

Each of the second to sixth transistors T2 to T6 and the driving transistor DT may be implemented as a PMOS type including a semiconductor layer having LTPS, which has a good response characteristic compared to an oxide semiconductor layer. On the other hand, the first and seventh transistors T1 and T7 connected to a gate electrode of the driving transistor DT may be implemented as an NMOS type including an oxide semiconductor layer which has a good off characteristic compared to the LTPS semiconductor layer.

An on level voltage of the PMOS-type transistor may be a gate low voltage, and an off level voltage may be a gate high voltage. On the other hand, an on level voltage of the NMOS-type transistor may be a gate high voltage, and an off level voltage may be a gate low voltage.

The light emitting element OLED may include an anode electrode (or a pixel electrode), a cathode electrode (or a common electrode), and an organic compound layer (configured with a common layer and an emission layer) disposed therebetween. The anode electrode of the light emitting element OLED may be connected to a fourth node N4, and the cathode electrode of the light emitting element OLED may be connected to a second power voltage ELVSS.

The driving transistor DT may include a gate electrode connected to the first node N1, a source electrode connected to a second node N2, and a drain electrode connected to a third node N3. The driving transistor DT may generate the driving current based on a voltage of the first node N1 (or a data voltage stored in the capacitor Cst) and may apply the driving current to the light emitting element OLED.

The first switch transistor T1 may include a gate electrode receiving a first scan signal SCAN1 through a first scan line SL1, a drain electrode connected to the drain electrode of the driving transistor DT at the third node N3, and a source electrode connected to gate electrode of the driving transistor DT at the first node N1. The first switch transistor T1 may be turned on in response to the first scan signal SCAN1 and may short-circuit the gate electrode and the drain electrode of the driving transistor DT with each other. Accordingly, the driving transistor DT may operate like a diode while the first switch transistor T1 is being turned on.

The second switch transistor T2 may include a gate electrode receiving a second scan signal SCAN2 through a second scan line SL2, a source electrode connected to a data line (or receiving a data voltage Vdata), and a drain electrode connected to the source electrode of the driving transistor DT at the second node N2. The second switch transistor T2 may be turned on in response to the second scan signal SCAN2 and may transfer the data voltage Vdata to the second node N2.

The capacitor Cst may be connected to gate electrode of the driving transistor DT and the drain electrode of the first switch transistor T1 at the first node N1 and an input terminal of the first power voltage ELVDD. The capacitor Cst may hold a voltage of the first node N1.

The third and fourth switch transistors T3 and T4 may be connected to the first power voltage ELVDD and the light emitting diode OLED and may form a current movement path through which the driving current generated by the driving transistor DT moves.

The third switch transistor T3 may include a source electrode connected to the input terminal of the first power voltage ELVDD, a drain electrode connected to the source electrode of the driving transistor DT and the drain electrode of the second switch transistor T2 at the second node N2, and a gate electrode which receives an emission control signal EM through an emission control line EL. The fourth switch transistor T4 may include a source electrode connected to the drain electrode of the driving transistor DT and the source electrode of the first switch transistor T1 at the third node N3, a drain electrode connected to the anode electrode of the light emitting element OLED at the fourth node N4, and a gate electrode which receives the emission control signal EM through the emission control line EL.

The third and fourth switch transistors T3 and T4 may be turned on in response to the emission control signal EM. While the third and fourth switch transistors T3 and T4 are being turned on, the light emitting element OLED may receive the driving current from the driving transistor DT and may emit light with brightness corresponding to the driving current.

The fifth switch transistor T5 may include a source electrode connected to an input terminal of an OBS voltage Vobs, a second electrode connected to the source electrode of the driving transistor DT, the drain electrode of the third switch transistor T3, and the drain electrode of the second switch transistor T2 at the second node N2, and a gate electrode which receives a third scan signal SCAN3 through a third scan line SL3. The fifth switch transistor T5 may be turned on based on the third scan signal SCAN3 and may apply the OBS voltage Vobs to the second node N2.

The sixth switch transistor T6 may include a source electrode connected to an input terminal of an anode reset voltage Var, a drain electrode connected to the anode electrode of the light emitting element OLED and the drain electrode of the fourth switch transistor T4 at the fourth node N4, and a gate electrode which receives the third scan signal SCAN3 through the third scan line SL3. The sixth switch transistor T6 may be turned on based on the third scan signal SCAN3 and may transfer the anode reset voltage Var to the fourth node N4.

The seventh switch transistor T7 may include a source electrode connected to an input terminal of an initialization voltage Vini, a second electrode connected to the storage capacitor Cst, the gate electrode of the driving transistor DT, and the drain electrode of the first switch transistor T1 at the first node N1, and a gate electrode which receives a fourth scan signal SCAN4 through a fourth scan line SL4. The seventh switch transistor T7 may be turned on based on the fourth scan signal SCAN4 and may apply the initialization voltage Vini to the first node N1.

Figure 4:
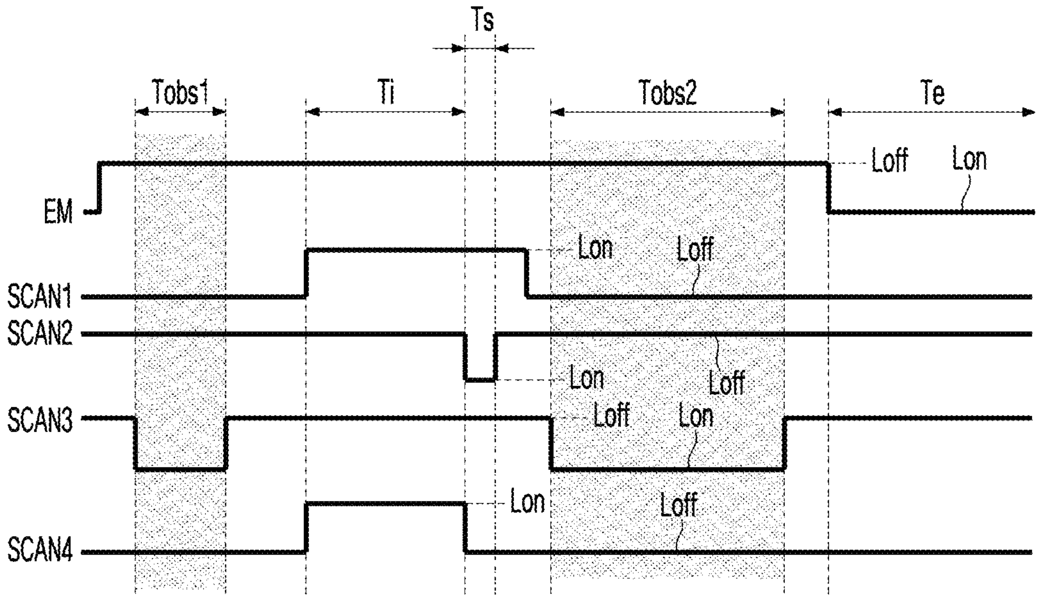
FIG. 4 is a driving waveform diagram of a pixel in a refresh frame according to an embodiment of the present disclosure.

FIG. 4 is a driving waveform diagram of a pixel in a refresh frame according to one embodiment.

Referring to FIG. 4, a first OBS period Tobs1, an initialization period Ti, a programming period Ts, a second OBS period Tobs2, and an emission period Te during which the pixel emits light based on a data voltage may be time-serially arranged in the refresh frame.

The second scan signal SCAN2 may define the programming period Ts where a data voltage Vdata is supplied. The programming period Ts may be an on level (Lon) period of a second scan signal SCAN2.

The third scan signal SCAN3 may define a first OBS period Tobs1 preceding (e.g., prior to) the programming period Ts and a second OBS period Tobs2 succeeding (e.g., after) the programming period Ts and preceding the emission period Te. That is, the third scan signal SCAN3 defines the timing and duration of the first OBS period Tobs1 and the timing and duration of the second OBS period Tobs2. The first OBS period Tobs1 and the second OBS period Tobs2 may be an on level (Lon) period of the third scan signal SCAN3.

The fourth scan signal SCAN4 may define an initialization period Ti which is arranged between the first OBS period Tobs1 and the programming period Ts. The initialization period Ti may be an on level (Lon) period of the fourth scan signal SCAN4.

The emission control signal EM may define an emission period Te succeeding the second OBS period Tobs2. The emission period Te may be an on level (Lon) period of the emission control signal EM.

Referring to FIGS. 3 and 4, in the first OBS period Tobs1, in response to the third scan signal SCAN3, the fifth and sixth switch transistors T5 and T6 may be turned on, and the other switch transistors T1 to T4 and T7 may be turned off.

In the first OBS period Tobs1, as the fifth switch transistor T5 is turned on, the fifth switch transistor T5 applies the OBS voltage Vobs to the first electrode of the driving transistor DT at the second node N2. Based on the OBS voltage Vobs, a drain-source channel of the driving transistor DT may be maximally opened, and the driving transistor DT may maintain a stronger saturation state, and thus, a hysteresis characteristic of the driving transistor DT may be recovered prior to data programming.

In the first OBS period Tobs1, as the sixth switch transistor T6 is turned on, the sixth switch transistor T6 applies the anode reset voltage to the anode electrode of the light emitting element OLED at the fourth node N4. Based on the anode reset voltage Var, residual electric charges charged in a parasitic capacitor formed between the anode electrode and the cathode electrode of the light emitting element OLED may be reset.

Referring to FIGS. 3 and 4, in the initialization period Ti, in response to the first scan signal SCAN1 and the fourth scan signal SCAN4, the first and seventh switch transistors T1 and T7 may be turned on, and the other switch transistors T2 to T6 may be turned off. As the seventh switch transistor T7 is turned on, the first node N1 may be initialized into the initialization voltage Vini, and as the first switch transistor T1 is turned on, the driving transistor DT may operate like a diode.

Referring to FIGS. 3 and 4, in the programming period Ts, as the first and second switch transistors T1 and T2 are turned on, a threshold voltage sampling operation and a data programming operation may be sequentially or simultaneously performed.

The data voltage Vdata may be applied to the second node N2 through the second switch transistor T2. The data voltage Vdata may be applied to the third node N3 through the driving transistor DT, and then, may be applied to the first node N1 through the first switch transistor T1. The driving transistor DT may operate like a diode in a state where the first switch transistor T1 is turned on, an electric potential at the gate electrode of the driving transistor DT connected to the first node N1 may be programmed to be "Vdata−|Vth|". A threshold voltage Vth may be sampled and reflected in a programmed electric potential at the gate electrode of the driving transistor DT.

Referring to FIGS. 3 and 4, during the second OBS period Tobs2, in response to the third scan signal SCAN3, the fifth and sixth switch transistors T5 and T6 may be turned on, and the other switch transistors T1 to T4 and T7 may be turned off.

During the second OBS period Tobs2, as the fifth switch transistor T5 is turned on, the OBS voltage Vobs may be applied to the second node N2. Based on the OBS voltage Vobs, a drain-source channel of the driving transistor DT may be maximally opened, and the driving transistor DT may maintain a stronger saturation state, and thus, a hysteresis characteristic of the driving transistor DT may be re-recovered prior to the emission of light.

During the second OBS period Tobs2, as the sixth switch transistor T6 is turned on, the anode reset voltage Var may be applied to the fourth node N4, and thus, residual electric charges charged in a parasitic capacitor of the light emitting element OLED may be re-reset.

Referring to FIGS. 3 and 4, in the emission period Te, in response to the emission control signal EM, the third and fourth switch transistors T3 and T4 may be turned on, and the other switch transistors T1, T2, T5, T6, and T7 may be turned off.

In the emission period Te, a driving current supplied from the driving transistor DT to the light emitting element OLED may be based on Vgs of the driving transistor DT set in the programming period Ts. The driving current may be irrelevant to a threshold voltage of the driving transistor DT and may be associated with the data voltage Vdata.

Figure 5:
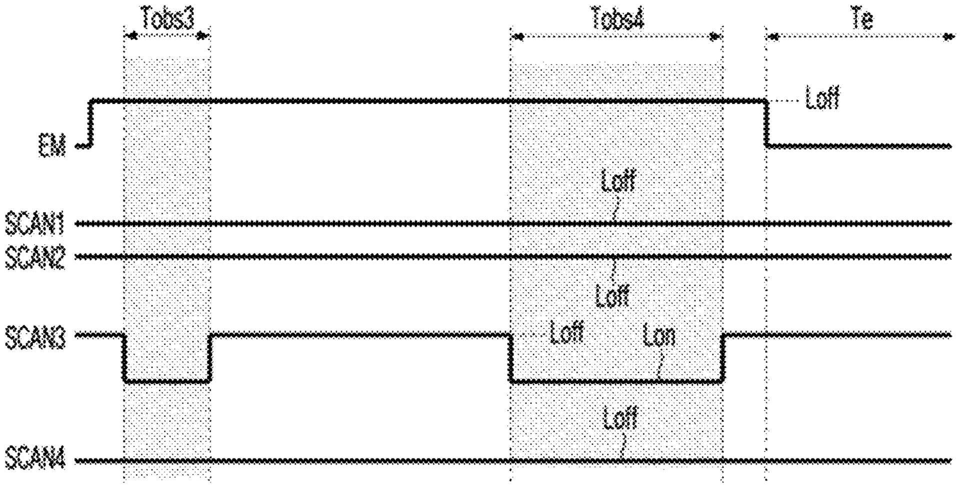
FIG. 5 is a diagram showing a driving waveform of a pixel in a skip frame according to an embodiment of the present disclosure.

FIG. 5 is a diagram showing a driving waveform of a pixel in a skip frame according to one embodiment.

Referring to FIG. 5, a third OBS period Tobs3, a fourth OBS period Tobs4, and an emission period Te may be time-serially arranged in the skip frame.

The emission control signal EM may define the emission period Te of the skip frame. An on level (Lon) period of the emission control signal EM in the skip frame may be substantially the same as the refresh frame.

The third scan signal SCAN3 may further define the third OBS period Tobs3 and the fourth OBS period Tobs4 which are sequentially arranged before the emission period Te, in the skip frame. That is, the third scan signal SCAN3 defines the timing and duration of the third OBS period Tobs3 and the fourth OBS period Tobs4 during the skip frame. In the skip frame, the third OBS period Tobs3 and the fourth OBS period Tobs4 may be an on level (Lon) period of the third scan signal SCAN3. During the skip frame, there are no intermediate periods between the third OBS period Tobs3 and the fourth OBS period Tobs4 in one embodiment.

Furthermore, the initialization period and the programming period may not be needed in the skip frame. Thus, the data voltage supplied to the pixel during the refresh frame is maintained during the skip frame.

Referring to FIGS. 3 and 5, a hysteresis characteristic of the driving transistor DT may be again recovered in the third OBS period Tobs3 and the fourth OBS period Tobs4, and thus, a hysteresis characteristic deviation between the skip frame and the refresh frame may be considerably reduced.

The first and second OBS periods Tobs1 and Tobs2 of the refresh frame may be included in an off level (Loff) period of the emission control signal EM, and moreover, the third and fourth OBS periods Tobs3 and Tobs4 of the skip frame may be included in the off level (Loff) period of the emission control signal EM.

A length of the off level (Loff) period of the emission control signal EM may be equal to each other in the refresh frame and the skip frame, and thus, a length of an emission maintenance time may be equal to each other in the refresh frame and the skip frame.

Figure 6:
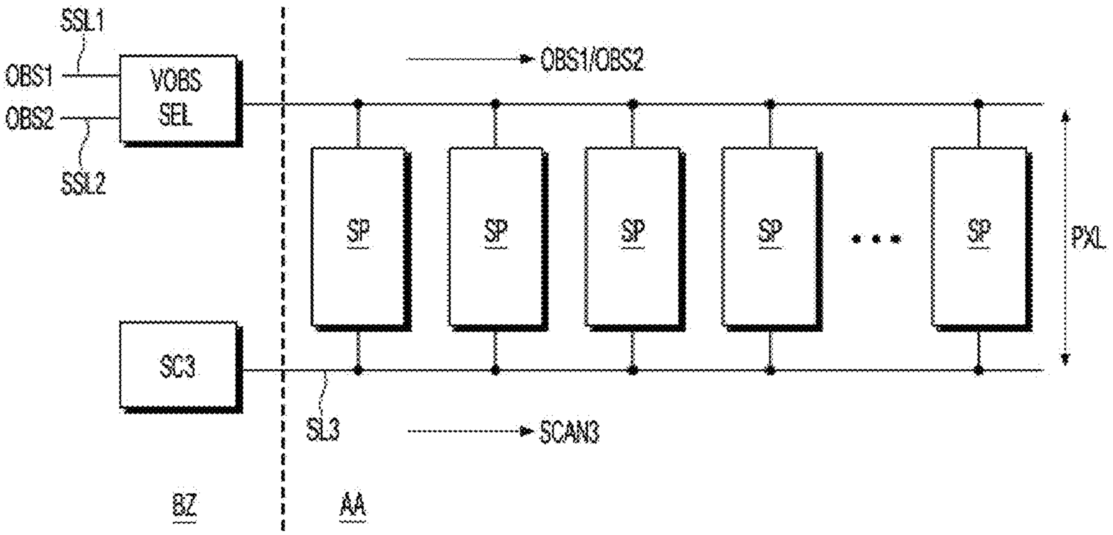
FIG. 6 is a diagram illustrating a configuration for adjusting an on-bias stress (OBS) voltage at different levels in a refresh frame.
Figure 7:
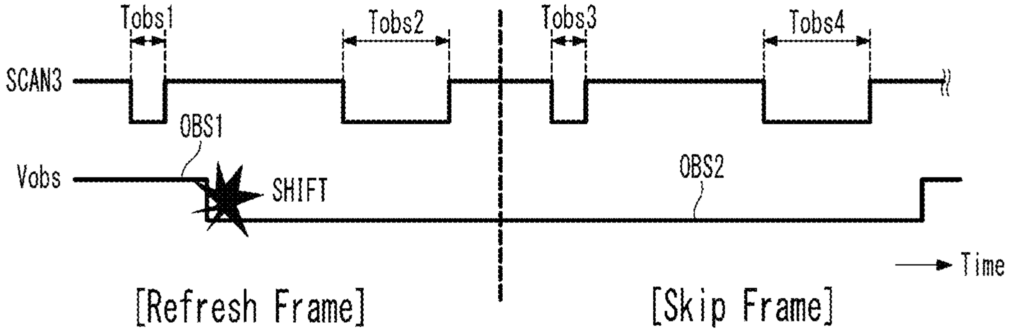
FIG. 7 is a diagram illustrating an example where an OBS voltage is shifted from a first level to a second level in a refresh frame, and then, is maintained at the second level during a skip frame according to an embodiment of the present disclosure.

FIG. 6 is a diagram illustrating a configuration for adjusting an OBS voltage at a different level in a refresh frame according to one embodiment. Also, FIG. 7 is a diagram illustrating an example where an OBS voltage is shifted from a first level to a second level in a refresh frame, and then, is maintained at the second level during a skip frame according to one embodiment.

As described above with reference to FIGS. 3 to 5, OBS driving may be for improving a luminance deviation (i.e., flicker characteristic) by decreasing a threshold voltage deviation between the refresh frame and the skip frame occurring due to a hysteresis characteristic variation of the driving transistor.

However, a voltage charged in a parasitic capacitor of the light emitting element OLED may increase due to an OBS voltage, and thus, low grayscale expression may be reduced.

The improvement of low grayscale expression and the improvement of a flicker characteristic may have a trade-off relationship therebetween. A relatively high OBS voltage may be needed for improving a flicker characteristic, but a relatively low OBS voltage may be needed for improving low grayscale expression.

The improvement of a flicker characteristic may be performed in the refresh frame where a threshold voltage sampling operation and a data programming operation are performed, and the improvement of low grayscale expression may be performed in all of the skip frame and the refresh frame where an emission operation is performed.

To this end, an OBS control circuit capable of varying a level of an OBS voltage in the refresh frame may be needed.

Referring to FIGS. 6 and 7, a scan driver SC3 and an OBS control circuit VOBS SEL may configure a GIP circuit block, in a bezel area BZ.

The scan driver SC3 may be connected to pixels SP included in a pixel row PXL of an active area AA through a third scan line SL3. The scan driver SC3 may supply the pixels SP with the third scan signal SCAN3 for defining a first OBS period Tobs1 preceding a supply timing of a data voltage and a second OBS period Tobs2 succeeding the supply timing of the data voltage and preceding an emission timing of each of the pixels SP, in a refresh frame.

The OBS control circuit VOBS SEL may receive a gate timing control signal (GVST and GCLK of FIG. 8) from a timing controller and may vary a level of an OBS voltage Vobs in the refresh frame, based on an output operation of the scan driver SC3.

The OBS control circuit VOBS SEL may receive an OBS voltage Vobs of a first level OBS1 through a first voltage source line SSL1 and may receive an OBS voltage Vobs of a second level OBS2 through a second voltage source line SSL2.

The OBS control circuit VOBS SEL may output the OBS voltage Vobs of the first level OBS1 to the pixels SP through a bias line BL in the first OBS period Tobs1 and may output the OBS voltage Vobs of the second level OBS2, differing from the first level OBS1, to the pixels SP through the bias line BL in the second OBS period Tobs2.

A relatively high OBS voltage (e.g., a first OBS voltage) may be needed for improving a flicker characteristic, and a relatively low OBS voltage (e.g., a second OBS voltage) may be needed for improving low grayscale expression, and thus, the OBS voltage Vobs of the second level OBS2 may be less than the OBS voltage Vobs of the first level OBS1.

In a third OBS period Tobs3 and a fourth OBS period Tobs4 of a skip frame further defined by the third scan signal SCAN3, the OBS control circuit VOBS SEL may maintain the OBS voltage Vobs at the second level OBS2 without shifting the magnitude of the OBS voltage Vobs. Thus, during the third OBS period Tobs3 and the fourth OBS period Tobs4, the OBS voltage Vobs has the second level OBS2. This may be because a threshold voltage sampling operation and a data programming operation are not performed in the skip frame.

Figure 8:
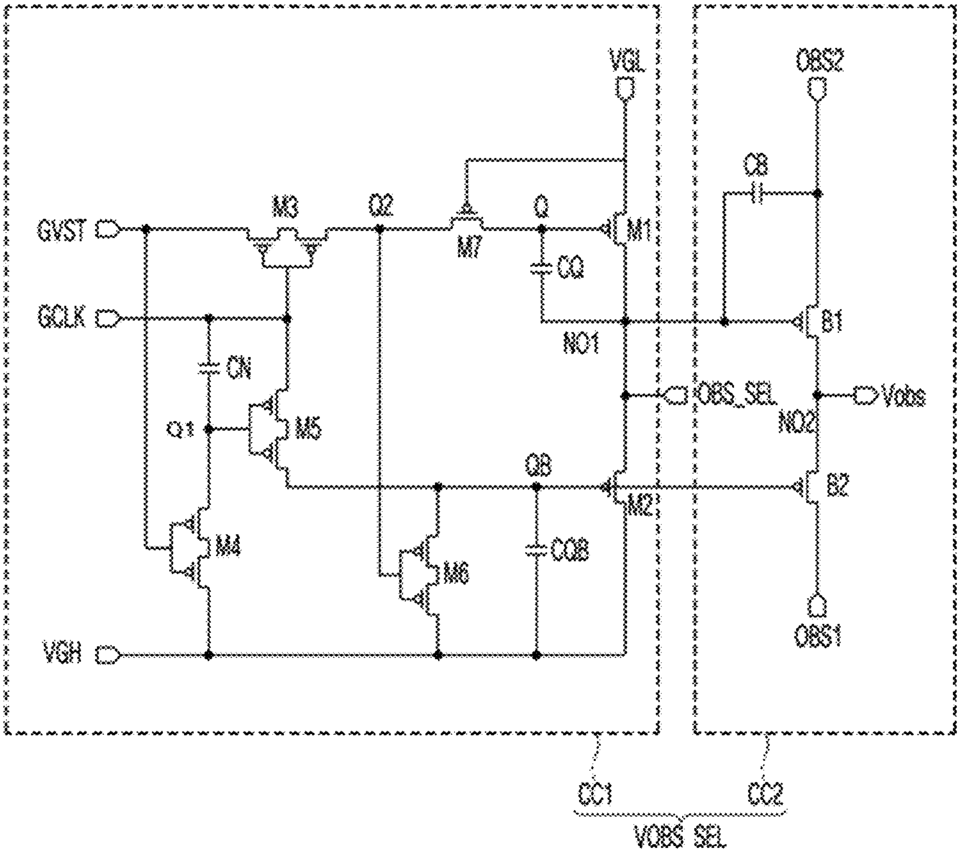
FIG. 8 is a diagram illustrating an OBS control circuit for controlling an OBS voltage according to an embodiment of the present disclosure.
Figure 9:
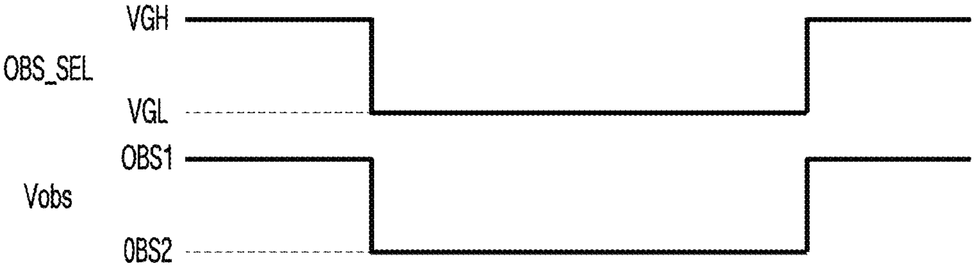
FIG. 9 is a diagram illustrating output signals of first and second circuit blocks configuring an OBS control circuit according to an embodiment of the present disclosure.

FIG. 8 is a diagram illustrating an OBS control circuit for controlling an OBS voltage according to one embodiment. FIG. 9 is a diagram illustrating output signals of first and second circuit blocks configuring an OBS control circuit according to one embodiment.

Referring to FIGS. 8 and 9, an OBS control circuit VOBS SEL may include a first circuit block CC1 that generates an OBS selection signal OBS_SEL associated with an output of the scan driver SC3 and a second circuit block CC2 that selectively outputs one of the OBS voltage Vobs of the first level OBS1 and the OBS voltage Vobs of the second level OBS1 in response to the OBS selection signal OBS_SEL.

Here, the second circuit block CC2 may be connected to the first circuit block CC1 through a first output node NO1 and may be connected to pixels SP through a second output node NO2 and a bias line (BL of FIG. 6).

Referring to FIGS. 7 to 9, the first circuit block CC1 may output an OBS selection signal OBS_SEL of a gate high voltage VGH to the first output node NO1 in the first OBS period Tobs1 and may output an OBS selection signal OBS_SEL of a gate low voltage VGL to the first output node NO1 in the second, third, and fourth OBS periods Tobs2, Tobs3, and Tobs4.

The first circuit block CC1 may include a pull-up transistor M1 which supplies the gate low voltage VGL to the first node NO1 to set the OBS selection signal OBS_SEL of the gate low voltage VGL in the first output node NO1. A gate electrode of the pull-up transistor M1 may be connected to a Q node, a source electrode thereof may be connected to an output terminal of the gate low voltage VGL, and a drain electrode thereof may be connected to the first output node NO1.

The first circuit block CC1 may include a pull-down transistor M2 which supplies the gate high voltage VGH to the first node NO1 to set the OBS selection signal OBS_SEL of the gate high voltage VGH in the first output node NO1. A gate electrode of the pull-down transistor M2 may be connected to a QB node, a source electrode thereof may be connected to an output terminal of the gate high voltage VGH, and a drain electrode thereof may be connected to the first output node NO1.

The first circuit block CC1 may further include a plurality of capacitors CN, CQ, and CQB and a plurality of transistors M3 to M7 for driving the Q node and the QB node with opposite electric potentials, in response to a gate timing control signal GVST and GCLK.

A gate electrode of the transistor M3 may be connected to an input terminal of a clock signal GCLK, a source electrode thereof may be connected to an input terminal of a start signal GVST, and a drain electrode thereof may be connected to a Q2 node.

A gate electrode of the transistor M4 may be connected to the input terminal of the start signal GVST, a source electrode thereof may be connected to an input terminal of the gate high voltage VGH, and a drain electrode thereof may be connected to a Q1 node.

A gate electrode of the transistor M5 may be connected to the Q1 node, a source electrode thereof may be connected to the input terminal of the clock signal GCLK, and a drain electrode thereof may be connected to a QB node.

A gate electrode of the transistor M6 may be connected to the Q2 node, a source electrode thereof may be connected to the input terminal of the gate high voltage VGH, and a drain electrode thereof may be connected to the QB node.

A gate electrode of the transistor M7 may be connected to an input terminal of the gate low voltage VGL, a source electrode thereof may be connected to the Q2 node, and a drain electrode thereof may be connected to the Q node. The transistor M7 may maintain an on state to connect the Q2 node to the Q node in a period where the pull-up transistor M1 is not turned on. On the other hand, the transistor M7 may be turned off only while the pull-up transistor M1 is being turned on and may electrically insulate the Q2 node from the Q node, thereby protecting the transistors connected to the Q2 node from a voltage of the Q node.

The capacitor CN may be connected to the input terminal of the clock signal GCLK and the Q1 node and may apply the clock signal GCLK to the Q1 node.

The capacitor CQ may be connected to the Q node and a first output node NO1 and may bootstrap the pull-up transistor M1.

The capacitor CQB may be connected to the QB node and the gate high voltage VGH and may bootstrap the pull-down transistor M2.

Referring to FIGS. 7 to 9, the second circuit block CC2 may output the OBS voltage Vobs of the first level OBS1 to a second output node NO2 in response to the OBS selection signal OBS_SEL of the gate high voltage VGH in the first OBS period Tobs1 and may output the OBS voltage Vobs of the second level OBS2 to the second output node NO2 in the second, third, and fourth OBS periods Tobs2, Tobs3, and Tobs4.

The second circuit block CC2 may include a pull-up buffer B1 and a pull-down buffer B2, which are connected to the second output node NO2.

The pull-up buffer B1 may include a gate electrode connected to the first output node NO1, a source electrode to which the OBS voltage Vobs of the second level OBS2 is input, and a drain electrode connected to the second node NO2.

The pull-down buffer B2 may include a gate electrode connected to the QB node, a source electrode to which the OBS voltage Vobs of the first level OBS1 is input, and a drain electrode connected to the second node NO2.

Figure 10:
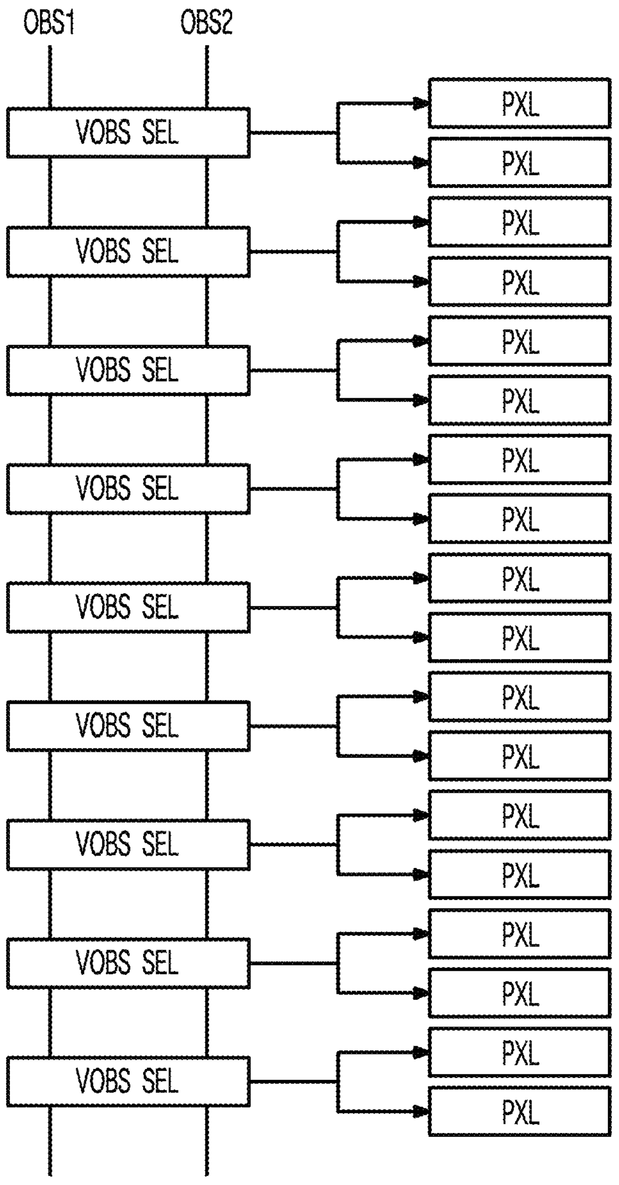
FIG. 10 is a diagram illustrating a connection configuration where two pixel rows share one OBS control circuit according to an embodiment of the present disclosure.
Figure 11:
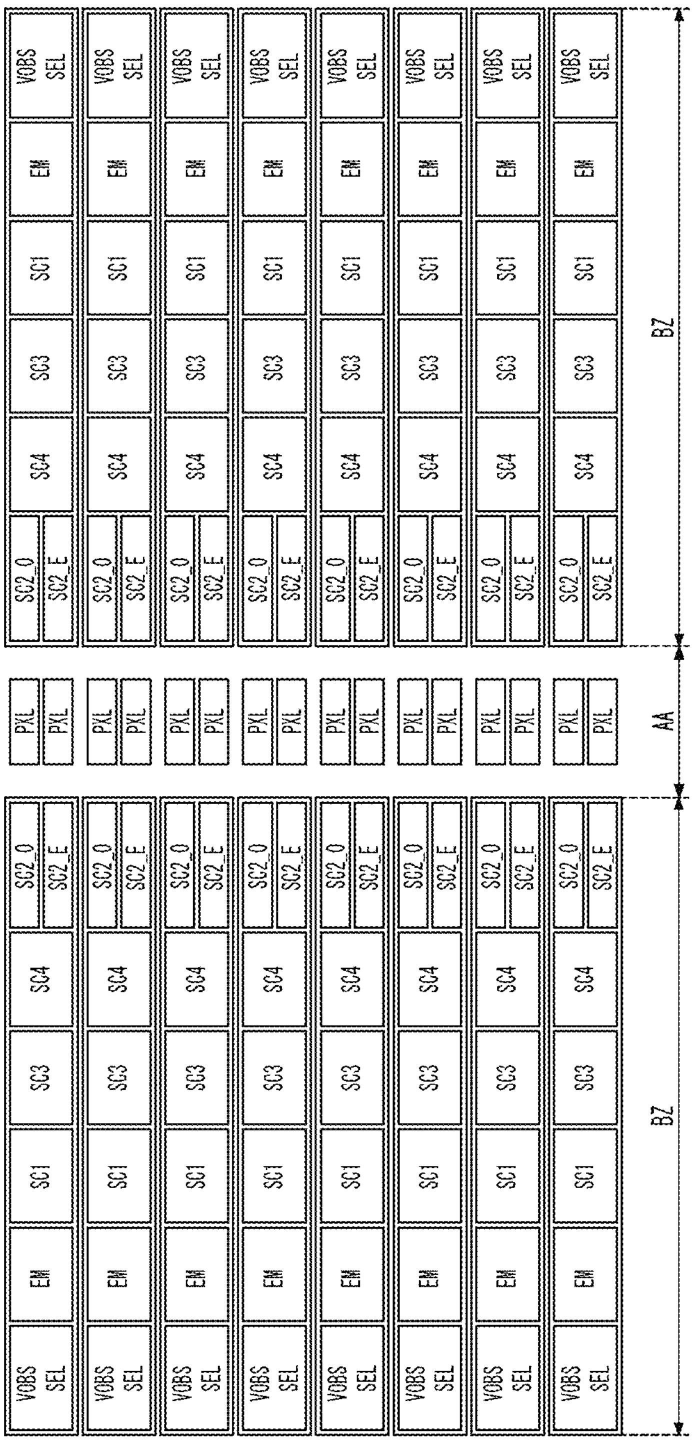
FIG. 11 is a diagram illustrating a GIP circuit block including OBS control circuits based on 2-pixel row sharing according to an embodiment of the present disclosure.
Figure 12:
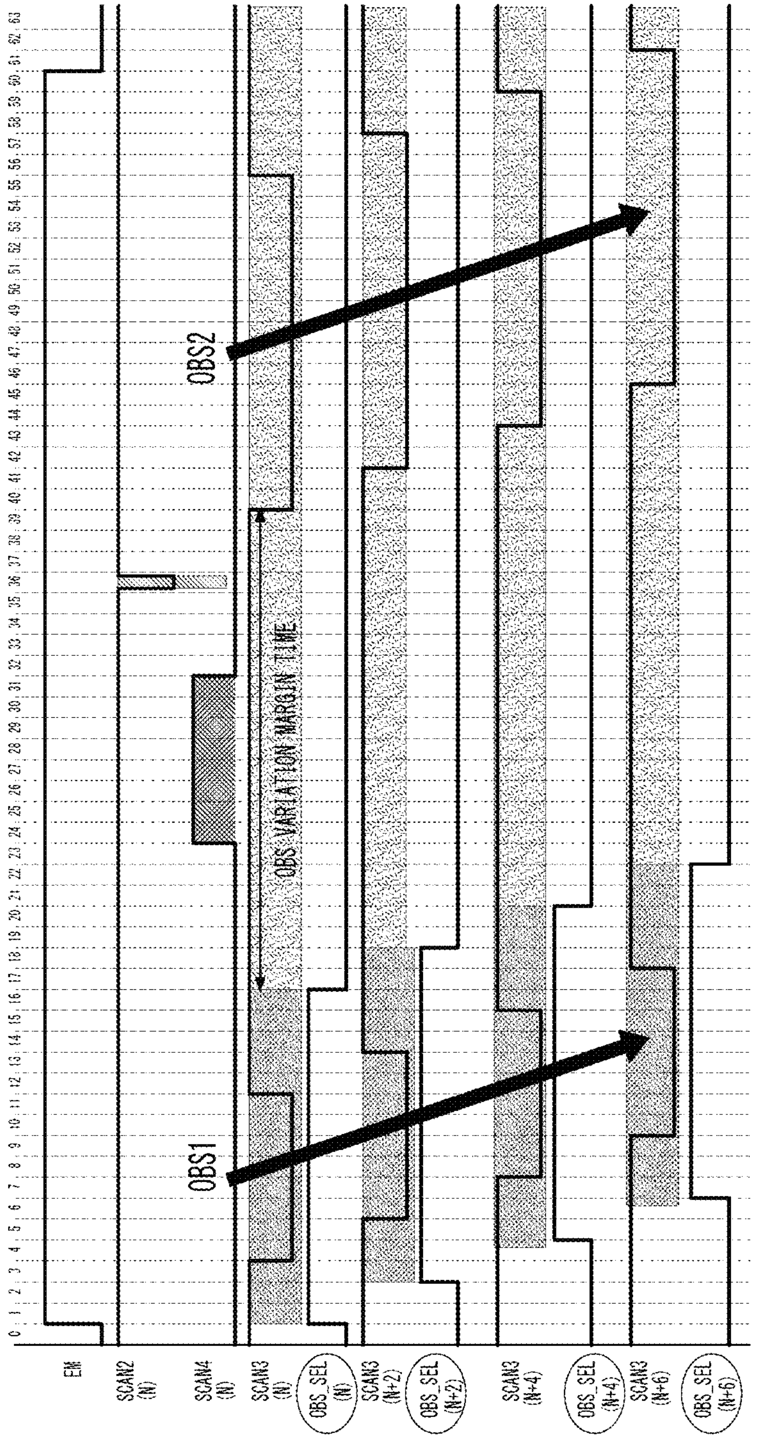
FIG. 12 is a diagram illustrating a variation margin time of an OBS voltage in a refresh frame in a case which is based on OBS control circuits based on 2-pixel row sharing according to an embodiment of the present disclosure.

FIG. 10 is a diagram illustrating a connection configuration where two pixel rows share one OBS control circuit according to one embodiment. FIG. 11 is a diagram illustrating a GIP circuit block including OBS control circuits based on 2k-pixel row sharing where k is a natural number according to one embodiment. FIG. 12 is a diagram illustrating a variation margin time of an OBS voltage in a refresh frame in a case which is based on OBS control circuits based on 2k-pixel row sharing.

Referring to FIG. 10, in order to decrease an area occupied by a GIP circuit block in a bezel area, each OBS control circuit VOBS SEL may be connected to pixels of two pixel rows PXL in common (e.g., a pair of pixel rows). To decrease a size of the GIP circuit block, some scan drivers and emission drivers may be connected to pixels of two pixel rows PXL in common.

For example, in order to drive the pixel circuit illustrated in FIG. 3, as in FIG. 11, the GIP circuit block may include OBS control circuits VOBS SEL based on 2-pixel row sharing, emission drivers EM based on 2-pixel row sharing, first, third, and fourth scan drivers SC1, SC3, and SC4 based on 2-pixel row sharing, second odd scan drivers SC2_O for driving odd pixel rows, and second even scan drivers SC2_E for driving even pixel rows. Here, the first, third, and fourth scan drivers SC1, SC3, and SC4 may respectively output the first, third, and fourth scan signals SCAN1, SCAN3, and SCAN4 of FIG. 3. The second scan drivers SC2_O and SC2_E may output the second scan signal SCAN2 of FIG. 3.

Even when two pixel rows share one OBS control circuit, a variation margin time of an OBS voltage in a refresh frame may be sufficient as in FIG. 12. In FIG. 12, the variation margin time of the OBS voltage may be defined as a period between a falling timing of an OBS selection signal OBS_SEL and a second falling time of a third scan signal SCAN3 for driving the two pixel rows.

Figure 13:
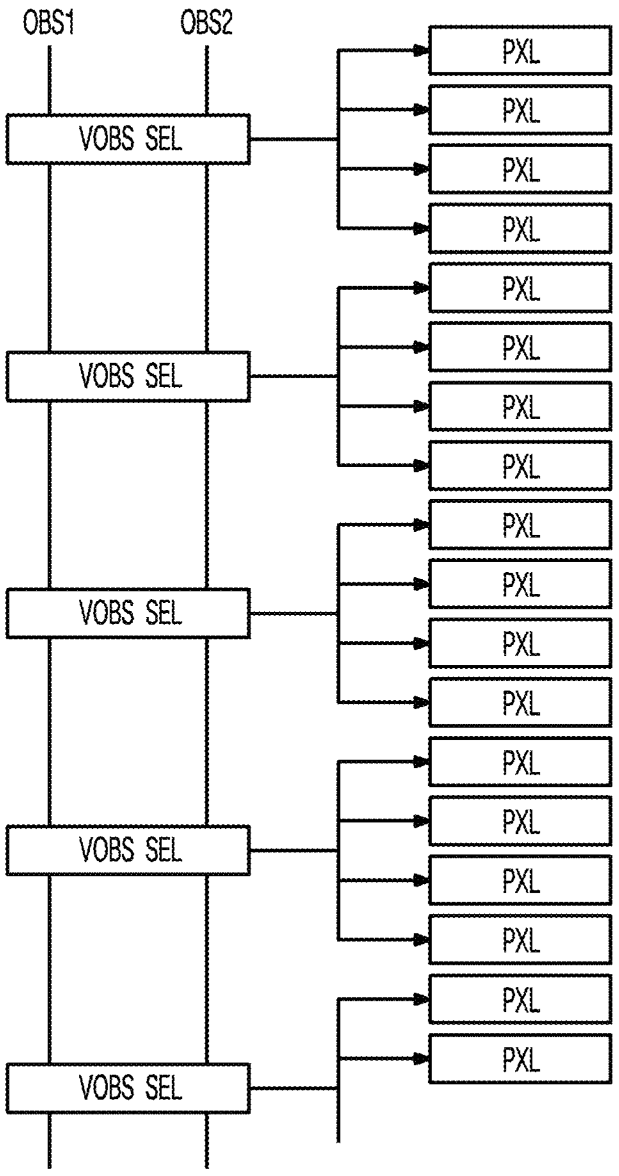
FIG. 13 is a diagram illustrating a connection configuration where four pixel rows share one OBS control circuit according to an embodiment of the present disclosure.
Figure 14:
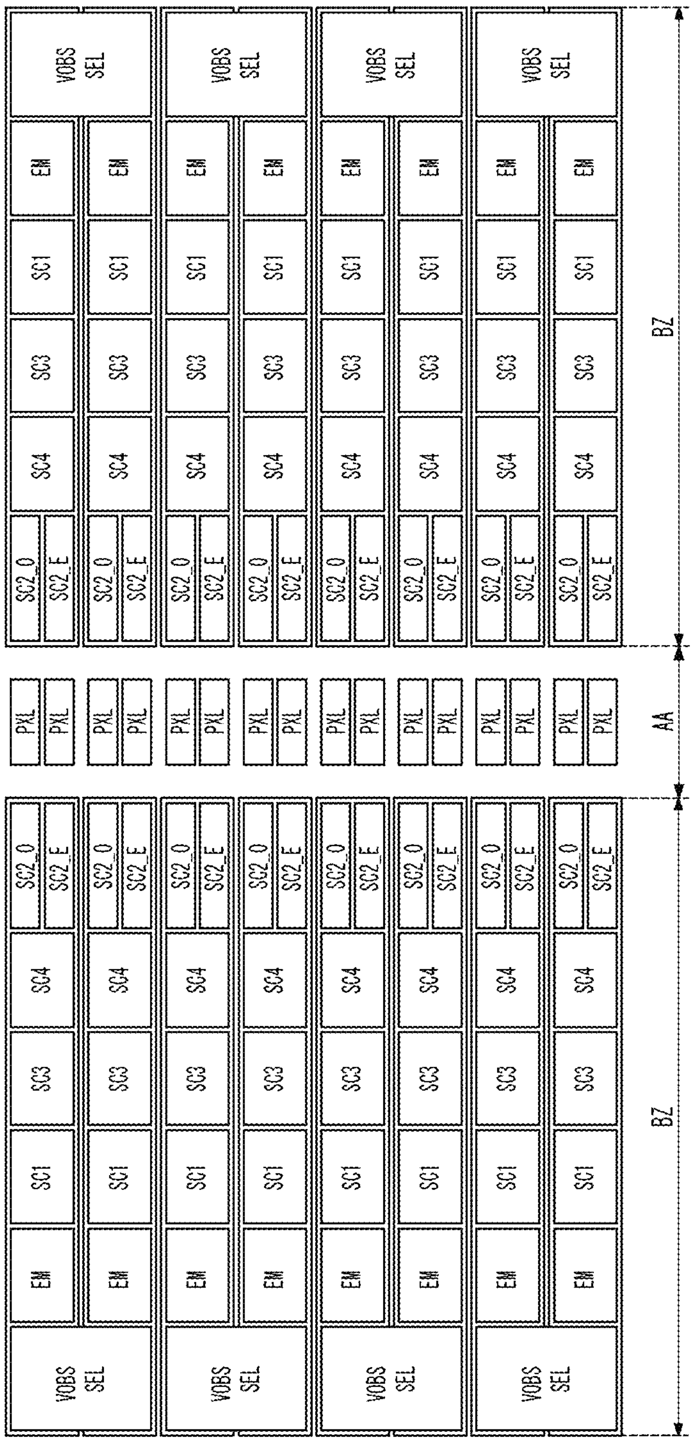
FIG. 14 is a diagram illustrating a GIP circuit block including OBS control circuits based on 4-pixel row sharing according to an embodiment of the present disclosure.
Figure 15:
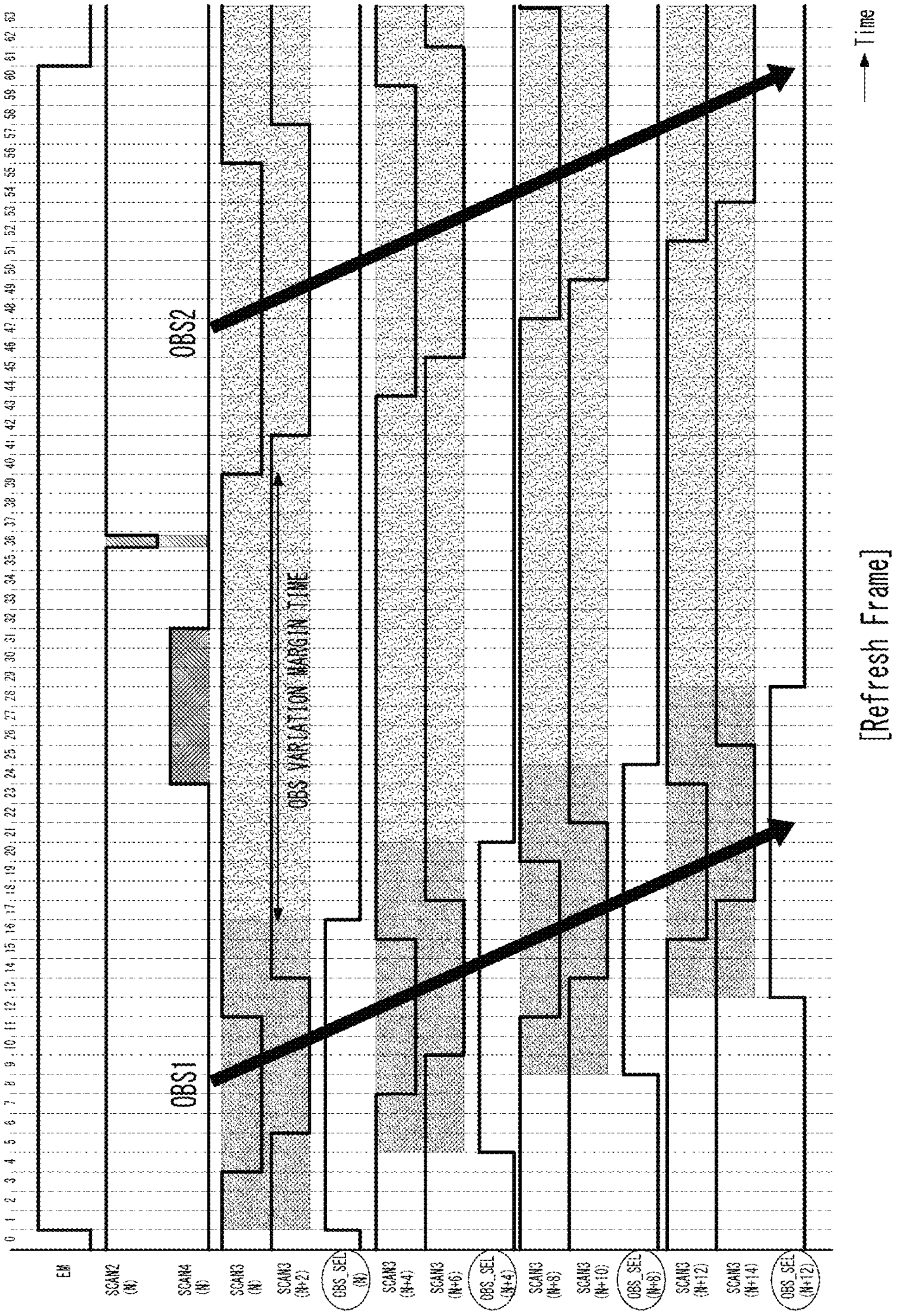
FIG. 15 is a diagram illustrating a variation margin time of an OBS voltage in a refresh frame in a case which is based on OBS control circuits based on 4-pixel row sharing according to an embodiment of the present disclosure.

FIG. 13 is a diagram illustrating a connection configuration where four pixel rows share one OBS control circuit according to one embodiment. FIG. 14 is a diagram illustrating a GIP circuit block including OBS control circuits based on 4-pixel row sharing according to one embodiment. FIG. 15 is a diagram illustrating a variation margin time of an OBS voltage in a refresh frame in a case which is based on OBS control circuits based on 4-pixel row sharing according to one embodiment.

Referring to FIG. 13, in order to decrease an area occupied by a GIP circuit block in a bezel area, each OBS control circuit VOBS SEL may be connected to pixels of four pixel rows PXL in common. To decrease a size of the GIP circuit block, some scan drivers and emission drivers may be connected to pixels of two pixel rows PXL in common.

For example, in order to drive the pixel circuit illustrated in FIG. 3, as in FIG. 14, the GIP circuit block may include OBS control circuits VOBS SEL based on 4-pixel row sharing, emission drivers EM based on 2-pixel row sharing, first, third, and fourth scan drivers SC1, SC3, and SC4 based on 2-pixel row sharing, second odd scan drivers SC2_O for driving odd pixel rows, and second even scan drivers SC2_E for driving even pixel rows.

Even when four pixel rows share one OBS control circuit, a variation margin time of an OBS voltage in a refresh frame may be sufficient as in FIG. 15. In FIG. 15, the variation margin time of the OBS voltage may be defined as a period between a falling timing of an OBS selection signal OBS_SEL and a second falling time of a third scan signal SCAN3 having a relatively early phase among two third scan signals SCAN3 for driving the four pixel rows.

Figure 16:
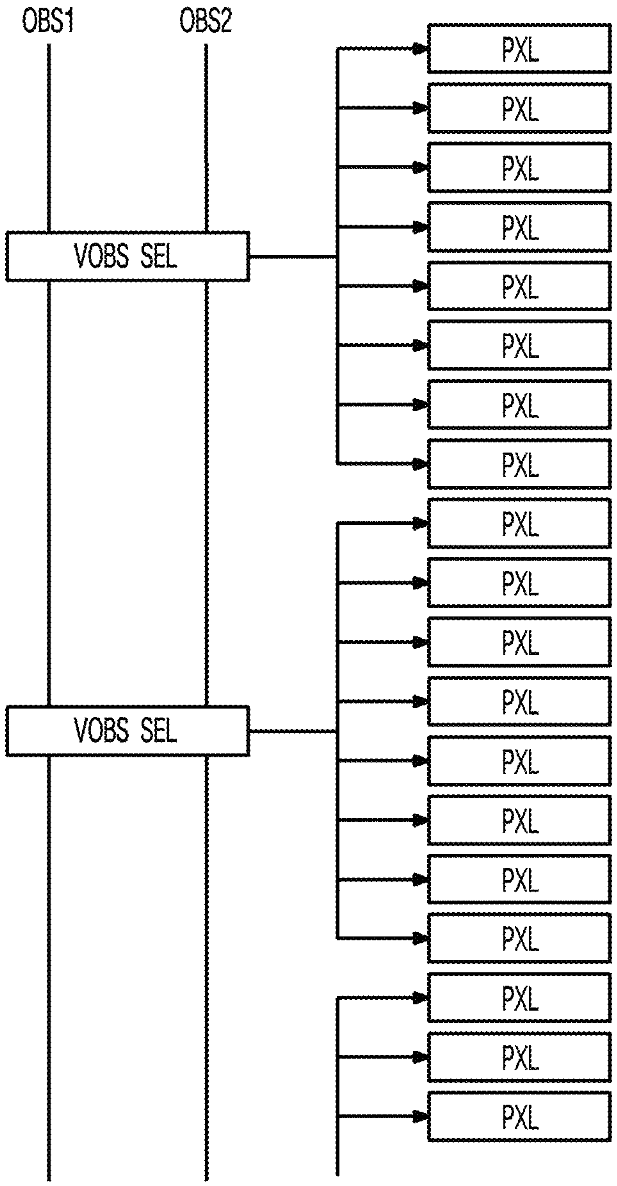
FIG. 16 is a diagram illustrating a connection configuration where eight pixel rows share one OBS control circuit according to an embodiment of the present disclosure.
Figure 17:
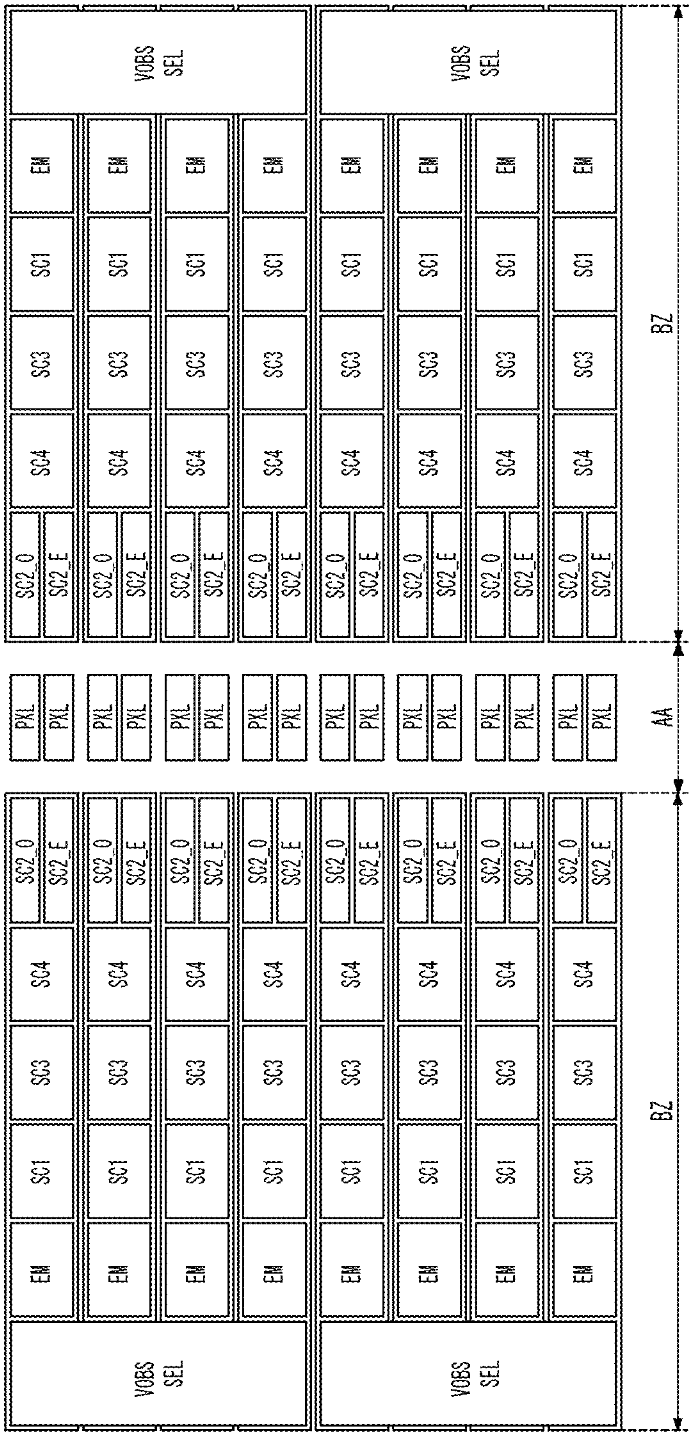
FIG. 17 is a diagram illustrating a GIP circuit block including OBS control circuits based on 8-pixel row sharing according to an embodiment of the present disclosure.
Figure 18:
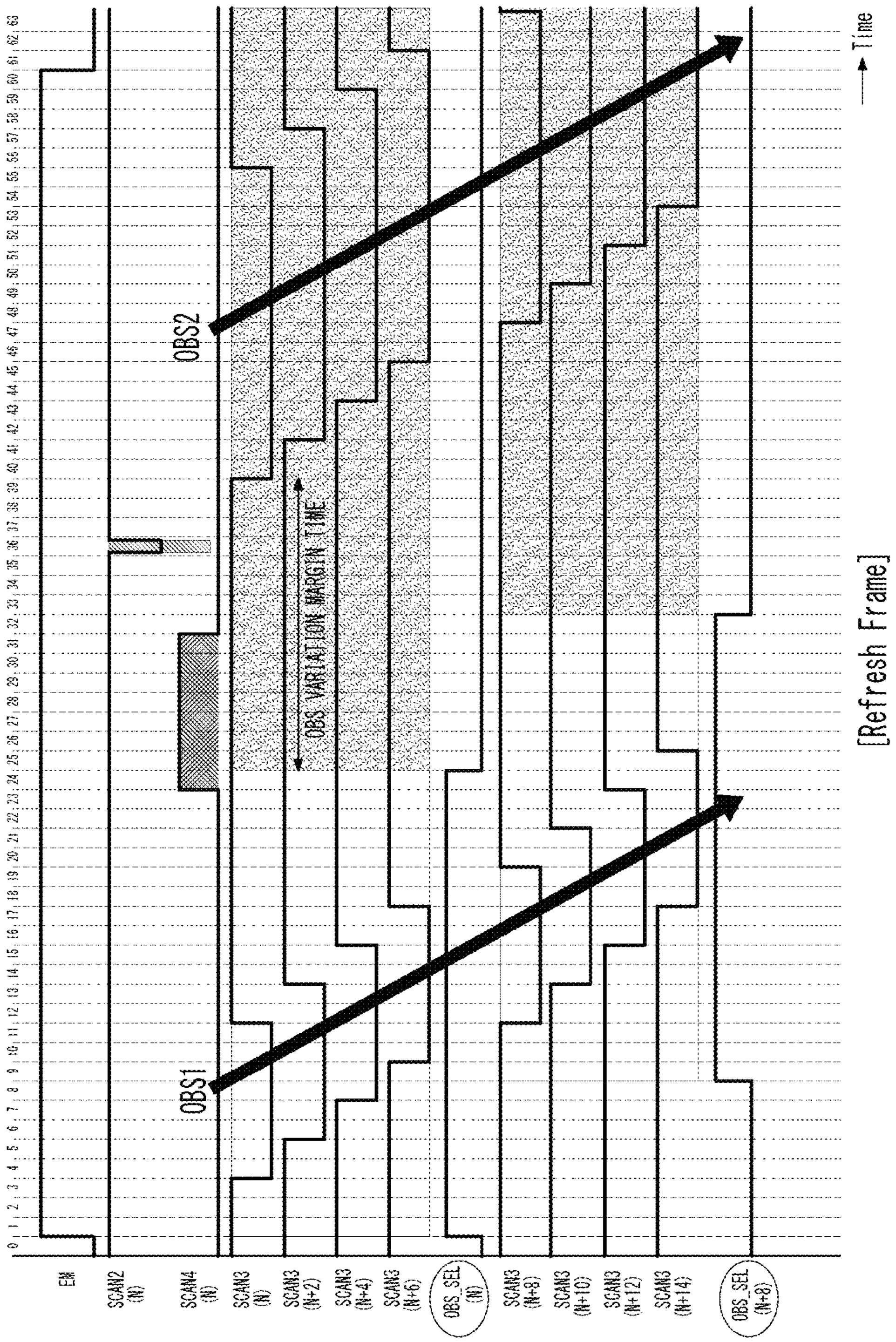
FIG. 18 is a diagram illustrating a variation margin time of an OBS voltage in a refresh frame in a case which is based on OBS control circuits based on 8-pixel row sharing according to an embodiment of the present disclosure.

FIG. 16 is a diagram illustrating a connection configuration where eight pixel rows share one OBS control circuit according to one embodiment. FIG. 17 is a diagram illustrating a GIP circuit block including OBS control circuits based on 8-pixel row sharing according to one embodiment. FIG. 18 is a diagram illustrating a variation margin time of an OBS voltage in a refresh frame in a case which is based on OBS control circuits based on 8-pixel row sharing according to one embodiment.

Referring to FIG. 16, in order to further decrease an area occupied by a GIP circuit block in a bezel area, each OBS control circuit VOBS SEL may be connected to pixels of eight pixel rows PXL in common. To decrease a size of the GIP circuit block, some scan drivers and emission drivers may be connected to pixels of two pixel rows PXL in common.

For example, in order to drive the pixel circuit illustrated in FIG. 3, as in FIG. 17, the GIP circuit block may include OBS control circuits VOBS SEL based on 8-pixel row sharing, emission drivers EM based on 2-pixel row sharing, first, third, and fourth scan drivers SC1, SC3, and SC4 based on 2-pixel row sharing, second odd scan drivers SC2_O for driving odd pixel rows, and second even scan drivers SC2_E for driving even pixel rows.

Even when eight pixel rows share one OBS control circuit, a variation margin time of an OBS voltage in a refresh frame may be sufficient as in FIG. 18. In FIG. 18, the variation margin time of the OBS voltage may be defined as a period between a falling timing of an OBS selection signal OBS_SEL and a second falling time of a third scan signal SCAN3 having a relatively earliest phase among four third scan signals SCAN3 for driving the four pixel rows.

Figure 19:
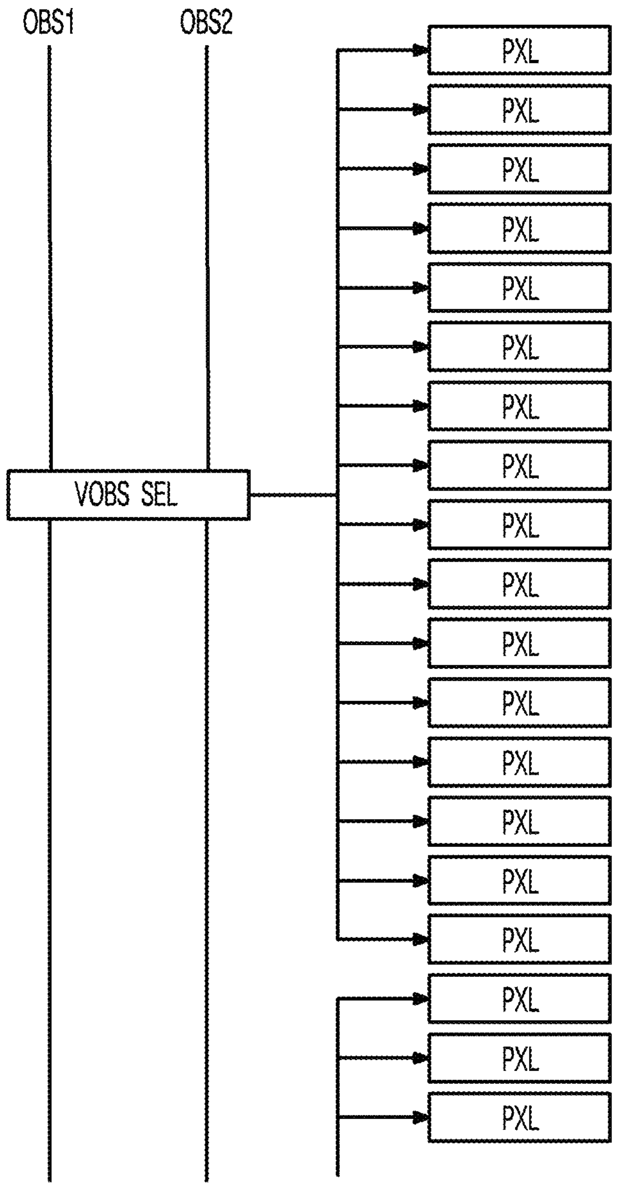
FIG. 19 is a diagram illustrating a connection configuration where sixteen pixel rows share one OBS control circuit according to an embodiment of the present disclosure.
Figure 20:
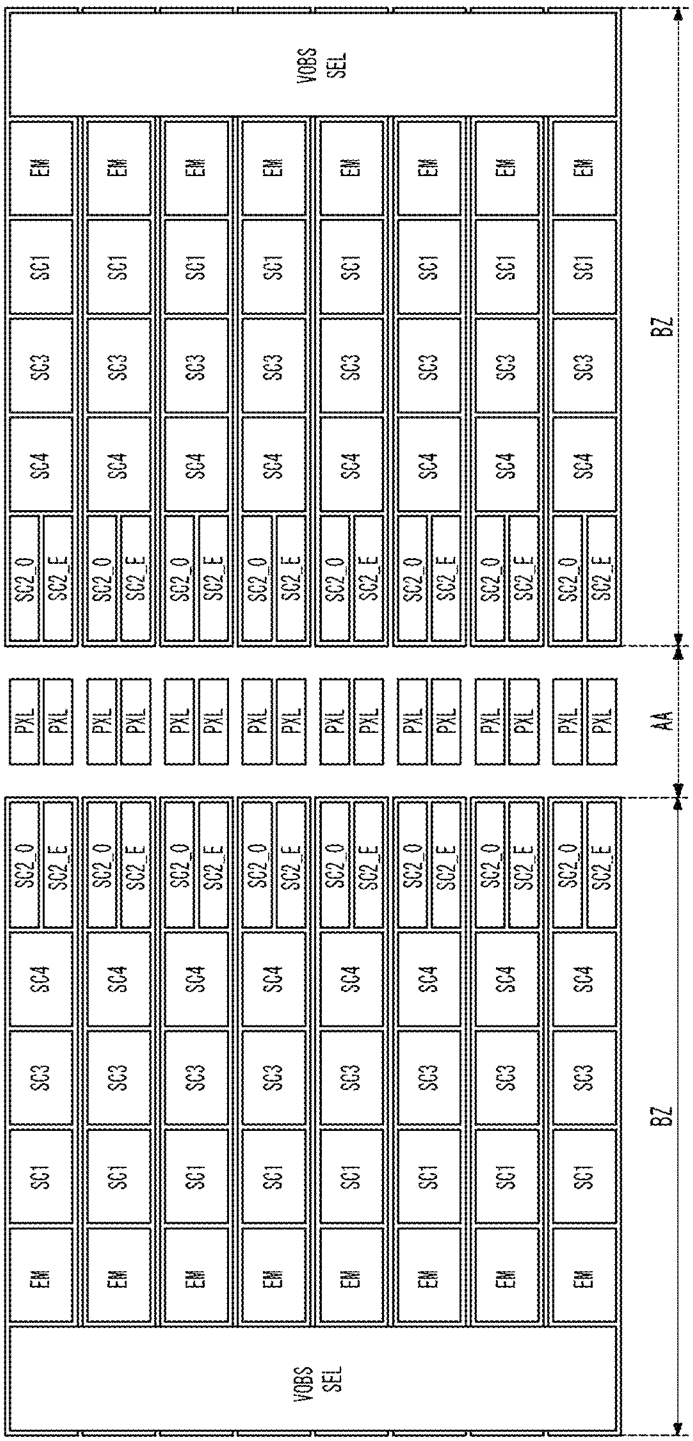
FIG. 20 is a diagram illustrating a GIP circuit block including OBS control circuits based on 16-pixel row sharing according to an embodiment of the present disclosure.
Figure 21:
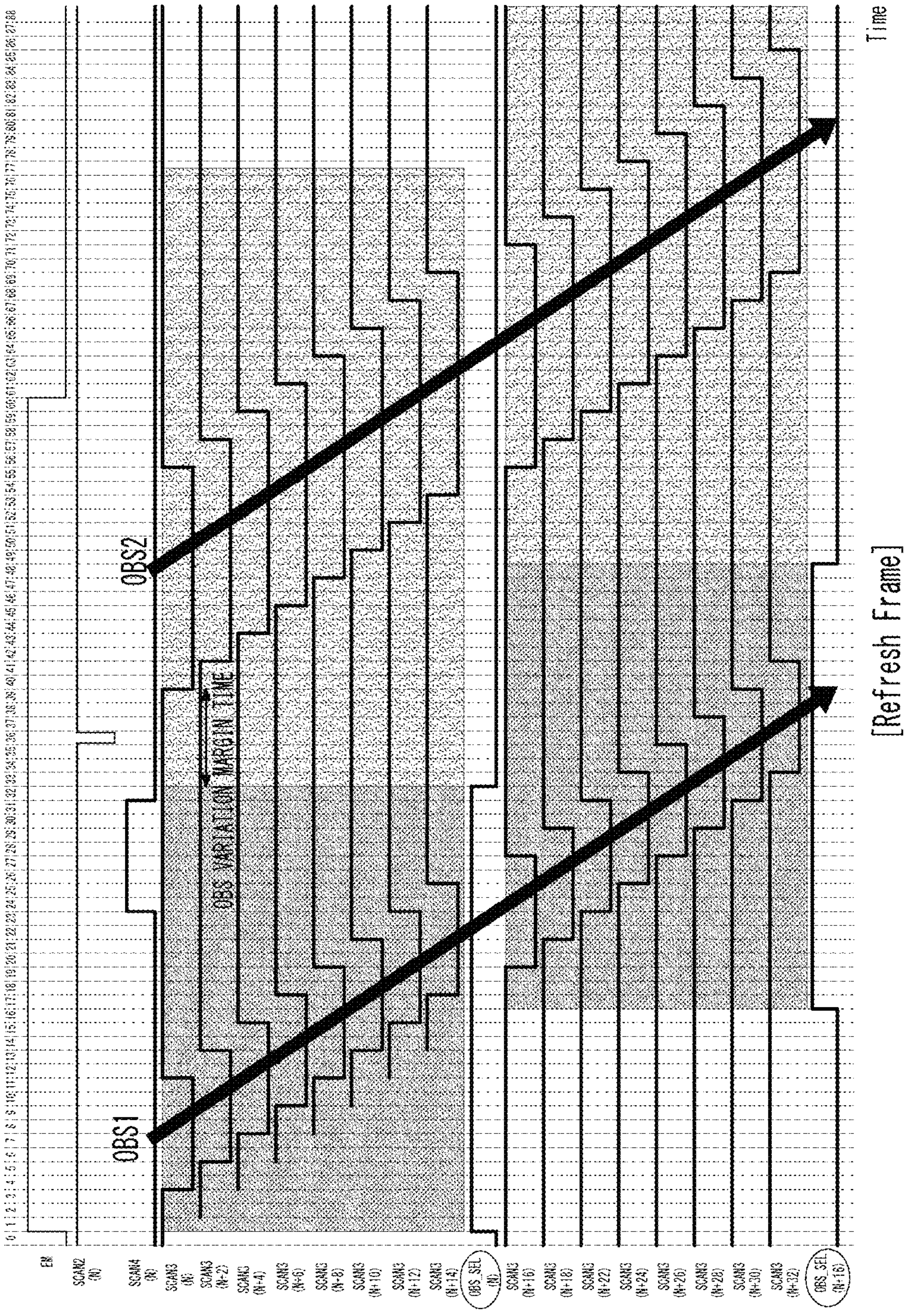
FIG. 21 is a diagram illustrating a variation margin time of an OBS voltage in a refresh frame in a case which is based on OBS control circuits based on 16-pixel row sharing according to an embodiment of the present disclosure.

FIG. 19 is a diagram illustrating a connection configuration where sixteen pixel rows share one OBS control circuit according to one embodiment. FIG. 20 is a diagram illustrating a GIP circuit block including OBS control circuits based on 16-pixel row sharing according to one embodiment. FIG. 21 is a diagram illustrating a variation margin time of an OBS voltage in a refresh frame in a case which is based on OBS control circuits based on 16-pixel row sharing according to one embodiment.

Referring to FIG. 19, in order to further decrease an area occupied by a GIP circuit block in a bezel area, each OBS control circuit VOBS SEL may be connected to pixels of sixteen pixel rows PXL in common. To decrease a size of the GIP circuit block, some scan drivers and emission drivers may be connected to pixels of two pixel rows PXL in common.

For example, in order to drive the pixel circuit illustrated in FIG. 3, as in FIG. 20, the GIP circuit block may include OBS control circuits VOBS SEL based on 16-pixel row sharing, emission drivers EM based on 2-pixel row sharing, first, third, and fourth scan drivers SC1, SC3, and SC4 based on 2-pixel row sharing, second odd scan drivers SC2_O for driving odd pixel rows, and second even scan drivers SC2_E for driving even pixel rows.

Even when sixteen pixel rows share one OBS control circuit, a variation margin time of an OBS voltage in a refresh frame may be sufficient as in FIG. 21. In FIG. 21, the variation margin time of the OBS voltage may be defined as a period between a falling timing of an OBS selection signal OBS_SEL and a second falling time of a third scan signal SCAN3 having a relatively earliest phase among eight third scan signals SCAN3 for driving the four pixel rows.

The present disclosure may realize the following effects.

The present disclosure may supply an OBS voltage at a first level according to a first OBS period of a refresh frame and may supply the OBS voltage at a second level according to a second OBS period of the refresh frame, thereby improving a flicker characteristic and low grayscale expression. As described above, the present disclosure may change an OBS voltage in the refresh frame according to a condition, and thus, may improve a flicker characteristic and may enhance low grayscale expression.

The effects according to the present disclosure are not limited to the above examples, and other various effects may be included in the specification.

In one embodiment, a display device includes: a display panel including at least one pixel; a source driver configured to supply a data voltage to the at least one pixel during a refresh frame; a scan driver configured to supply the at least one pixel with a scan signal during the refresh frame, the scan signal defining a timing of a first on-bias stress (OBS) period that precedes a timing at which the data voltage is supplied to the at least one pixel and a timing of a second OBS period that succeeds the timing at which the data voltage is supplied to the at least one pixel and precedes an emission timing of the at least one pixel during which the at least one pixel emits light based on the data voltage; and an OBS control circuit configured to supply a first OBS voltage to the at least one pixel during the first OBS period and supply a second OBS voltage to the at least one pixel during the second OBS period, the first OBS voltage having a first level and the second OBS voltage having a second level that is different from the first level.

In one embodiment, the second level of the second OBS voltage is less than the first level of the first OBS voltage.

In one embodiment, the data voltage is not supplied to the at least one pixel during at least one skip frame that succeeds the refresh frame and the data voltage is maintained during the at least one skip frame, and the scan signal supplied to the at least one pixel further defines a timing of a third OBS period during the at least one skip frame and a timing of a fourth OBS period during the at least one skip frame that succeeds the third OBS period, and the OBS control circuit supplies the second OBS voltage having the second level to the at least one pixel during the third OBS period and the fourth OBS period.

In one embodiment, the display panel comprises an active area that displays an image corresponding to the data voltage and a bezel area that at least partially surrounds the active area and does not display an image, and the scan driver and the OBS control circuit are disposed in the bezel area.

In one embodiment, the display panel further comprises a plurality of pixel rows including the at least one pixel, the plurality of pixel rows connected to the OBS control circuit through a plurality of bias lines.

In one embodiment, 2k number of pixel rows share the OBS control circuit where k is a natural number.

In one embodiment, a driving method of a display device including a display panel comprising at least one pixel, the driving method comprising: supplying a data voltage to the at least one pixel during a refresh frame; supplying the at least one pixel with a scan signal during the refresh frame, the scan signal defining a timing of a first on-bias stress (OBS) period that precedes a timing at which the data voltage is supplied to the at least one pixel and a timing of a second OBS period that succeeds the timing at which the data voltage is supplied to the at least one pixel and precedes an emission timing of the at least one pixel during which the at least one pixel emits light based on the data voltage; and supplying a first OBS voltage to the at least one pixel during the first OBS period and supplying a second OBS voltage to the at least one pixel during the second OBS period, the first OBS voltage having a first level and the second OBS voltage having a second level that is different from the first level.

In one embodiment, the second OBS voltage of the second level is less than the first level of the first OBS voltage.

In one embodiment, the data voltage is not supplied to the at least one pixel during at least one skip frame that succeeds the refresh frame and the data voltage is maintained during the at least one skip frame, and the scan signal supplied to the at least one pixel further defines a third OBS period and a fourth OBS period in the at least one skip frame that succeeds the third OBS period, and the second OBS voltage having the second level is supplied to the at least one pixel during the third OBS period and the fourth OBS period.

In one embodiment, a display device comprises: a display panel including a pixel, the pixel comprising: a driving transistor including a gate electrode connected to a first node, a first electrode connected to a second node, and a second electrode connected to a third node; a light-emitting element electrically connected to the second electrode of the driving transistor; a first switch transistor connected to the gate electrode of the driving transistor at the first node and second electrode of the driving transistor at the third node; a second switch transistor connected to the first electrode of the driving transistor at the second node and to a data line that supplies a data voltage; and a bias switch transistor connected to the first electrode of the driving transistor at the second node and to a bias line that supplies to the bias switch transistor one of a first bias voltage or a second bias voltage that is different from the first bias voltage; a source driver configured to supply the data voltage to the data line during a refresh frame; and a scan driver a scan driver configured to supply the pixel with a scan signal during the refresh frame, the scan signal defining a timing of a first on-bias stress (OBS) period that is before a timing at which the data voltage is supplied to the pixel and a timing of a second OBS period that is after the timing at which the data voltage is supplied to the pixel and is before an emission period of the pixel during which the light-emitting element emits light based on the data voltage, wherein the bias switch transistor applies the first bias voltage to the first electrode of the driving transistor during the first OBS period and applies the second bias voltage that is different from the first bias voltage to the first electrode of the driving transistor during the second OBS period during the refresh frame.

In one embodiment, the second bias voltage is less than the first bias voltage.

In one embodiment, the data voltage is not supplied to the pixel during a skip frame that is after the refresh frame and the data voltage is maintained during the skip frame, and the scan signal supplied to the pixel further defines a timing of a third OBS period and a timing of a fourth OBS period during the skip frame that is after the emission period of the refresh frame, and the bias switch transistor applies the second bias voltage to the first electrode of the driving transistor during the third OBS period and the fourth OBS period.

In one embodiment, the display device further comprises: an OBS control circuit configured to supply the first bias voltage to the bias line during the first OBS period and supply the second bias voltage to the bias line during the second OBS period.

In one embodiment, the display panel further comprises: a plurality of pixel rows including the pixel, the plurality of pixel rows connected to the OBS control circuit through a plurality of bias lines that include the bias line.

In one embodiment, the OBS control circuit comprises: a first circuit block configured to output a first OBS selection signal having a gate high voltage to a first output node during the first OBS period and output a second OBS selection signal of a gate low voltage that is less than the gate high voltage to the first output node during the second OBS period, the third OBS period, and the fourth OBS period; and a second circuit block configured to output the first bias voltage to a second output node in response to the first OBS selection signal having the gate high voltage during the first OBS period and output the second bias voltage to the second output node in response to the second OBS selection signal having the gate low voltage during the second OBS period, the third OBS period, and the fourth OBS period, and the second circuit block is connected to the first circuit block at the first output node and is connected to the pixel at the second output node and the bias line.

In one embodiment, the first circuit block comprises: a pull-up transistor configured to supply the gate low voltage to the first output node to set the second OBS selection signal having the gate low voltage in the first output node based on control of a Q node; and a pull-down transistor configured to supply the gate high voltage to the first output node to set the first OBS selection signal having the gate high voltage in the first output node based on control of a QB node.

In one embodiment, the second circuit block comprises: a pull-up buffer including a gate connected to the first output node, a source to which the second bias voltage is input, and a drain connected to the second output node; and a pull-down buffer including a gate connected to the QB node, a source to which the first bias voltage is input, and a drain connected to the second output node.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display device comprising:

a display panel including at least one pixel;

a source driver configured to supply a data voltage to the at least one pixel during a refresh frame;

a scan driver configured to supply the at least one pixel with a scan signal during the refresh frame, the scan signal defining a timing of a first on-bias stress (OBS) period that precedes a timing at which the data voltage is supplied to the at least one pixel and a timing of a second OBS period that succeeds the timing at which the data voltage is supplied to the at least one pixel and precedes an emission timing of the at least one pixel during which the at least one pixel emits light based on the data voltage; and an OBS control circuit configured to supply a first OBS voltage to the at least one pixel during the first OBS period and supply a second OBS voltage to the at least one pixel during the second OBS period, the first OBS voltage having a first level and the second OBS voltage having a second level that is less than the first level.

2. The display device of claim 1, wherein the data voltage is not supplied to the at least one pixel during at least one skip frame that succeeds the refresh frame and the data voltage is maintained during the at least one skip frame, wherein the scan signal supplied to the at least one pixel further defines a timing of a third OBS period during the at least one skip frame and a timing of a fourth OBS period during the at least one skip frame that succeeds the third OBS period, and the OBS control circuit supplies the second OBS voltage having the second level to the at least one pixel during the third OBS period and the fourth OBS period.

3. The display device of claim 1, wherein the display panel comprises an active area that displays an image corresponding to the data voltage and a bezel area that at least partially surrounds the active area and does not display an image, and wherein the scan driver and the OBS control circuit are disposed in the bezel area.

4. The display device of claim 1, wherein the display panel further comprises:

a plurality of pixel rows including the at least one pixel, the plurality of pixel rows connected to the OBS control circuit through a plurality of bias lines.

5. The display device of claim 4, wherein $2^k$ number of pixel rows share the OBS control circuit where k is a natural number.

6. The display device of claim 2, wherein the OBS control circuit comprises:

a first circuit block configured to output a first OBS selection signal having a gate high voltage to a first output node during the first OBS period and output a second OBS selection signal of a gate low voltage that is less than the gate high voltage to the first output node during the second OBS period, the third OBS period, and the fourth OBS period; and a second circuit block configured to output the first OBS voltage having the first level to a second output node in response to the first OBS selection signal having the gate high voltage during the first OBS period and output the second OBS voltage having the second level to the second output node in response to the second OBS selection signal having the gate low voltage during the second OBS period, the third OBS period, and the fourth OBS period, and wherein the second circuit block is connected to the first circuit block at the first output node and is connected to the at least one pixel at the second output node and a corresponding bias line.

7. The display device of claim 6, wherein the first circuit block comprises:

a pull-up transistor configured to supply the gate low voltage to the first output node to set the second OBS selection signal having the gate low voltage in the first output node based on control of a Q node; and a pull-down transistor configured to supply the gate high voltage to the first output node to set the first OBS selection signal having the gate high voltage in the first output node based on control of a QB node.

8. The display device of claim 7, wherein the second circuit block comprises:

a pull-up buffer including a gate connected to the first output node, a source to which the second OBS voltage having the second level is input, and a drain connected to the second output node; and a pull-down buffer including a gate connected to the QB node, a source to which the first OBS voltage having the first level is input, and a drain connected to the second output node.

9. A driving method of a display device including a display panel comprising at least one pixel, the driving method comprising:

supplying a data voltage to the at least one pixel during a refresh frame;

supplying the at least one pixel with a scan signal during the refresh frame, the scan signal defining a timing of a first on-bias stress (OBS) period that precedes a timing at which the data voltage is supplied to the at least one pixel and a timing of a second OBS period that succeeds the timing at which the data voltage is supplied to the at least one pixel and precedes an emission timing of the at least one pixel during which the at least one pixel emits light based on the data voltage; and supplying a first OBS voltage to the at least one pixel during the first OBS period and supplying a second OBS voltage to the at least one pixel during the second OBS period, the first OBS voltage having a first level and the second OBS voltage having a second level that is less than the first level.

10. The driving method of claim 9, wherein the data voltage is not supplied to the at least one pixel during at least one skip frame that succeeds the refresh frame and the data voltage is maintained during the at least one skip frame, wherein the scan signal supplied to the at least one pixel further defines a third OBS period and a fourth OBS period in the at least one skip frame that succeeds the third OBS period, and the second OBS voltage having the second level is supplied to the at least one pixel during the third OBS period and the fourth OBS period.

11. A display device comprising:

a display panel including a pixel, the pixel comprising:

a driving transistor including a gate electrode connected to a first node, a first electrode connected to a second node, and a second electrode connected to a third node;

a light-emitting element electrically connected to the second electrode of the driving transistor;

a first switch transistor connected to the gate electrode of the driving transistor at the first node and second electrode of the driving transistor at the third node;

a second switch transistor connected to the first electrode of the driving transistor at the second node and to a data line that supplies a data voltage; and a bias switch transistor connected to the first electrode of the driving transistor at the second node and to a bias line that supplies to the bias switch transistor one of a first bias voltage or a second bias voltage that is different from the first bias voltage;

a source driver configured to supply the data voltage to the data line during a refresh frame; and a scan driver configured to supply the pixel with a scan signal during the refresh frame, the scan signal defining a timing of a first on-bias stress (OBS) period that is before a timing at which the data voltage is supplied to the pixel and a timing of a second OBS period that is after the timing at which the data voltage is supplied to the pixel and is before an emission period of the pixel during which the light-emitting element emits light based on the data voltage, wherein the bias switch transistor applies the first bias voltage to the first electrode of the driving transistor during the first OBS period and applies the second bias voltage that is less than the first bias voltage to the first electrode of the driving transistor during the second OBS period during the refresh frame.

12. The display device of claim 11, wherein the data voltage is not supplied to the pixel during a skip frame that is after the refresh frame and the data voltage is maintained during the skip frame, wherein the scan signal supplied to the pixel further defines a timing of a third OBS period and a timing of a fourth OBS period during the skip frame that is after the emission period of the refresh frame, and the bias switch transistor applies the second bias voltage to the first electrode of the driving transistor during the third OBS period and the fourth OBS period.

13. The display device of claim 12, further comprising:

an OBS control circuit configured to supply the first bias voltage to the bias line during the first OBS period and supply the second bias voltage to the bias line during the second OBS period.

14. The display device of claim 13, wherein the display panel further comprises:

a plurality of pixel rows including the pixel, the plurality of pixel rows connected to the OBS control circuit through a plurality of bias lines that include the bias line.

15. The display device of claim 13, wherein the OBS control circuit comprises:

a first circuit block configured to output a first OBS selection signal having a gate high voltage to a first output node during the first OBS period and output a second OBS selection signal of a gate low voltage that is less than the gate high voltage to the first output node during the second OBS period, the third OBS period, and the fourth OBS period; and a second circuit block configured to output the first bias voltage to a second output node in response to the first OBS selection signal having the gate high voltage during the first OBS period and output the second bias voltage to the second output node in response to the second OBS selection signal having the gate low voltage during the second OBS period, the third OBS period, and the fourth OBS period, and wherein the second circuit block is connected to the first circuit block at the first output node and is connected to the pixel at the second output node and the bias line.

16. The display device of claim 15, wherein the first circuit block comprises:

a pull-up transistor configured to supply the gate low voltage to the first output node to set the second OBS selection signal having the gate low voltage in the first output node based on control of a Q node; and a pull-down transistor configured to supply the gate high voltage to the first output node to set the first OBS selection signal having the gate high voltage in the first output node based on control of a QB node.

17. The display device of claim 16, wherein the second circuit block comprises:

a pull-up buffer including a gate connected to the first output node, a source to which the second bias voltage is input, and a drain connected to the second output node; and a pull-down buffer including a gate connected to the QB node, a source to which the first bias voltage is input, and a drain connected to the second output node.

* * * * *